United States Patent [19]
Uchida et al.

[11] Patent Number: 5,622,664
[45] Date of Patent: *Apr. 22, 1997

[54] METHOD FOR PRODUCING PATTERNED SHAPED ARTICLE

[75] Inventors: Hiroshi Uchida, Ashikaga; Mituhiro Onuki, Kiryu; Hideo Watanabe, Ashikaga, all of Japan

[*] Notice: The term of this patent shall not extend beyond the expiration date of Pat. No. 5,368,791.

[73] Assignee: CCA Inc., Tokyo, Japan

[21] Appl. No.: 293,964

[22] Filed: Aug. 24, 1994

[30] Foreign Application Priority Data

Aug. 24, 1993 [JP] Japan .................................. 5-229643

[51] Int. Cl.$^6$ ................................................. B29C 39/12
[52] U.S. Cl. ................. 264/113; 264/122; 264/139; 264/162; 264/241; 264/245; 264/DIG. 31
[58] Field of Search ............................... 264/101, 112, 264/113, 125, 135, 139, 154, 162, 239, 241, 245, 571, DIG. 31, 109, 122; 156/154; 428/143, 147, 156

[56] References Cited

U.S. PATENT DOCUMENTS

| | | | |
|---|---|---|---|
| 3,941,636 | 3/1976 | Drout et al. | 156/154 |
| 5,368,791 | 11/1994 | Uchida et al. | 264/113 |

Primary Examiner—Robert A. Dawson
Assistant Examiner—Kenneth M. Jones
Attorney, Agent, or Firm—Oblon, Spivak, McClelland, Maier & Neustadt, P.C.

[57] ABSTRACT

A method of producing a patterned shaped circle includes the steps of forming a course of dry particles on a base surface; using an air flow controller having either a suction port or a blow port or both a suction port and a blow port to cause an air flow to form a cavity in the dry particle course by removing a part of the particles thereof under the control of at least one parameter among air pressure, air flow rate, air flow speed, air flow direction, air flow pulsation, air flow intermittence, suction port size, blow port size, suction port position and blow port position; charging the cavity with a different type of dry particles; and allowing the particles to set into an integral mass.

18 Claims, 21 Drawing Sheets

11(12)

11(12)

11(12)

11
(12)

11(12)

METHOD FOR PRODUCING PATTERNED SHAPED ARTICLE

BACKGROUND OF THE INVENTION

1. Field of the Invention

This invention relates to a method for producing patterned shaped articles using an air flow controller, more particularly to such a method for producing patterned concrete shaped articles, patterned artificial stone shaped articles, patterned raw products for sintering into ceramic shaped articles, patterned ceramic shaped articles, patterned metal shaped articles, patterned impasto shaped articles, patterned plastic shaped articles, patterned shaped foodstuffs and the like, and to an apparatus for producing patterned shaped articles.

2. Description of the Prior Art

Up to now the only way available for providing a part of a surface, such as of paving blocks, with a pattern indicating a crosswalk, a stop sign or other such traffic control mark or for providing the entire surface of the blocks with a pattern has been to paint the surface with a coating material such as paint or to inlay the desired pattern.

Since the patterns painted on a part or all of the surface of paving blocks are exposed to abrasion from, for example, the shoes of pedestrians walking on the blocks and the tires of vehicles driving over them, they quickly wear off and have to be redone at frequent intervals. The amount of labor involved in this work is considerable. Where the pattern is formed by inlaying, the work itself is troublesome and very costly.

An object of this invention is to provide for a method and an apparatus for producing various types of patterned shaped articles with surface patterns formed by pattern courses of prescribed thickness, by use of an air flow controller and computer control.

SUMMARY OF THE INVENTION

For attaining this object, the invention provides for a method of producing a pattern shaped article comprising the steps of forming a course of dry particles on a base surface; using an air flow controller having either a suction port or a blow port or both a suction port and a blow port to cause an air flow to form a cavity in the dry particle course by removing a part of the particles thereof under the control of at least one parameter among air pressure, air flow rate, air flow speed, air flow direction, air flow pulsation, air flow intermittence, suction port size, blow port size, suction port position and blow port position; charging the cavity with a different type of dry particles; and allowing the particles to set into an integral mass.

The invention further provides for an apparatus for producing a patterned shaped article, comprising: cavity forming means having an air flow controller disposed above a course of dry particles formed on a base surface, provided with at least one of a suction port and a blow port, and causing an air flow to form a cavity in the dry particle course by removing a part of the particles thereof under the control of at least one parameter among air pressure, air flow rate, air flow speed, air flow direction, air flow pulsation, air flow intermittence, suction port size, blow port size, suction port position and blow port position; and means for supplying a different type of particles into the formed cavity.

Thus the method of producing a patterned shaped article according to the invention uses an air flow controller equipped with a suction port and/or blow port and computer controls at least one parameter among the pressure, flow rate, flow speed, flow direction, flow pulsation and flow intermittence of air supplied to the suction port or blow port, the suction port size, the blow port size, the suction port position and the blow port position, whereby it becomes possible to mass produce patterned shaped articles with high precision.

The above and other objects, characteristic features and advantages of the invention will become apparent to those skilled in the art from the description of the invention given hereinbelow with reference to the accompanying drawings.

DESCRIPTION OF THE PREFERRED EMBODIMENTS

The inventors previously applied for patent on an invention entitled "Method for producing patterned shaped article" (U.S. patent application Ser. No. 08/021,554 now abandoned, corresponding to Japanese Patent Application No. 4-73221).

Figure 1A:
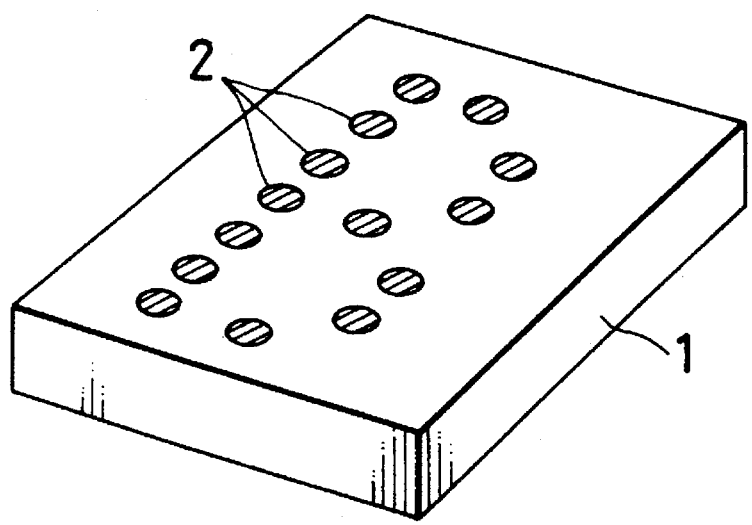
FIG. 1(a) is a perspective view showing a first example of a shaped article produced by the invention.
Figure 1B:
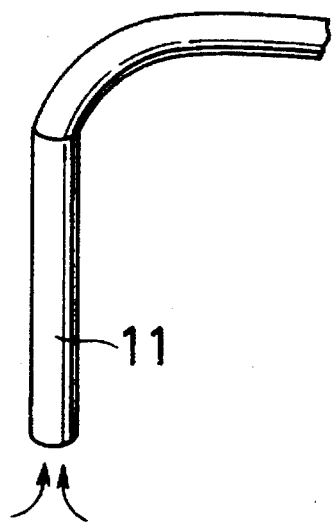
FIG. 1(b) is a perspective view of one type of suction port used in this invention.

The present invention improves on the earlier invention by providing it with an air flow controller for particle supply and removal which, by enabling connection with a computer, considerably facilitates the production of variously patterned shaped articles. More specifically, the method of producing patterned shaped articles using an air flow controller according to this invention enables the production of shaped articles with a wide variety of patterns by employing any of variously configured air flow controllers equipped with a suction port and/or a blow port and by controlling at least one parameter among air pressure, air flow rate, air flow speed, air flow direction, air flow pulsation, air flow intermittence, suction port size, blow port size, suction port position and blow port position. While in the interest of brevity the following description will be limited to the patterns shown in FIGS. 1–15, the invention is also capable of producing a great variety of other forms. FIG. 1(a) shows and example of a shaped article patterned with the letter B expressed in dots, FIGS. 2–5 show examples of cavity formation using an air flow controller having a suction port, FIG. 6 shows an example of a shaped article patterned with a mountain scene produced from a photograph, FIGS. 7–10 show examples of cavity formation using an air flow controller having a blow port, FIG. 11 shows an example of a shaped article patterned with alphabet letters expressed in continuous lines, and FIGS. 12–15 show examples of cavity formation using an air flow controller having both a suction port and a blow port.

The "air flow controller" used throughout herein is defined by an apparatus equipped with a suction port and/or a blow port for forming cavities in a particle course by the action of suction and/or blowing.

Although the particles for producing a particle course on a base surface and the particles to be charged in the cavity/cavities formed in the particle course are dry, they may have absorbed one or more of water, oil, lubricant-bonding agent, solvent, setting agent or plasticizer if they are not kneaded with water, oil, lubricant-bonding agent, solvent, setting agent or plasticizer and are in a state readily broken up for supply.

Figure 2A:
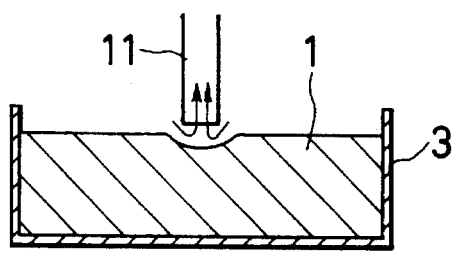
FIG. 2(a) is sectional view showing the suction port of FIG. 1(b) being used to form a cavity in a particle course.
Figure 3A:
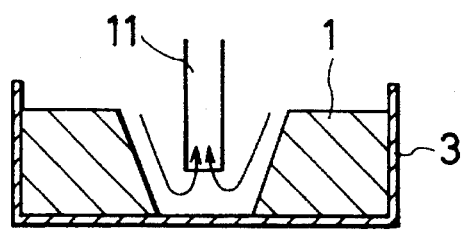
FIG. 3(a) is a sectional view showing a cavity being formed by inserting a suction port into a particle course.
Figure 2B:
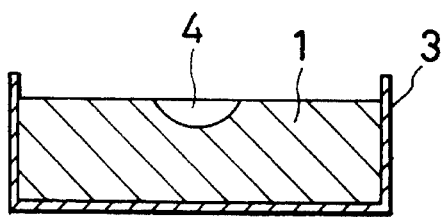
FIG. 2(b) is a sectional view showing the cavity formed in the particle course.
Figure 3B:
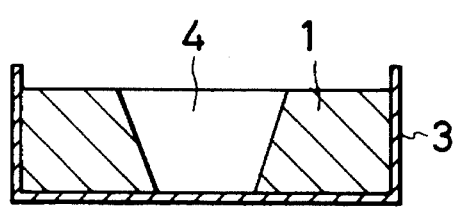
FIG. 3(b) is a sectional view showing the cavity formed in the particle course.
Figure 2C:
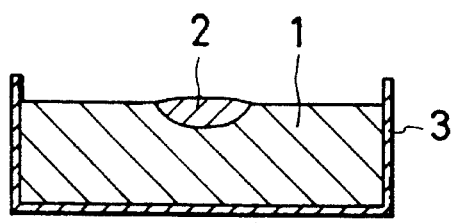
FIG. 2(c) is a sectional view showing the cavity charged with a different type of particles.
Figure 3C:
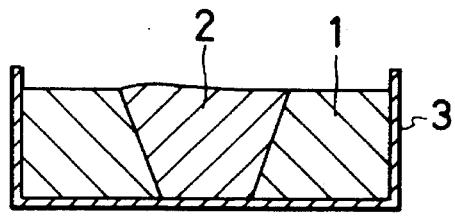
FIG. 3(c) is a sectional view showing the cavity charged with a different type of particles.
Figure 4A:
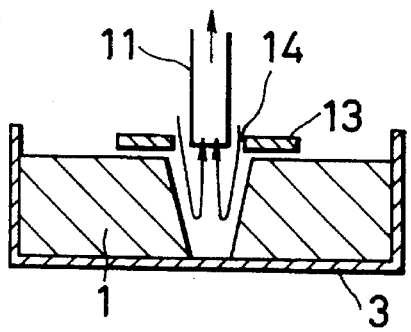
FIG. 4(a) is a sectional view showing a cavity being formed in a particle course using a suction port equipped with a skirt.
Figure 5A:
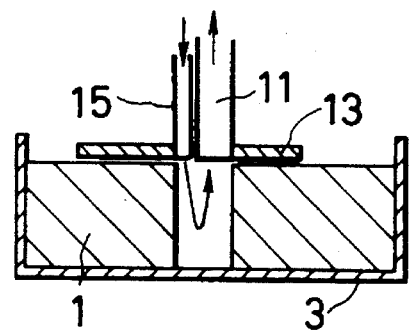
FIG. 5(a) is a sectional view showing a cavity being formed in a particle course using a suction port equipped with a skirt and a breather tube.
Figure 4B:
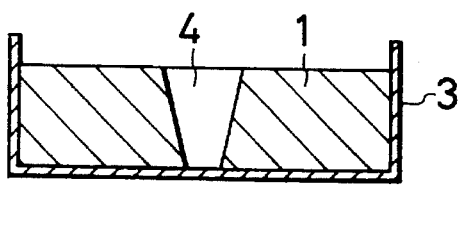
FIG. 4(b) is a sectional view showing the cavity formed in the particle course.
Figure 5B:
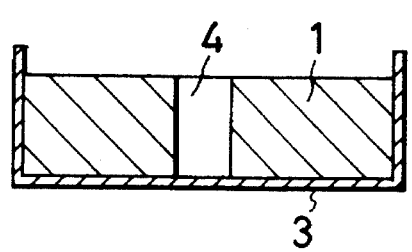
FIG. 5(b) is a sectional view showing the cavity formed in the particle course.
Figure 4C:
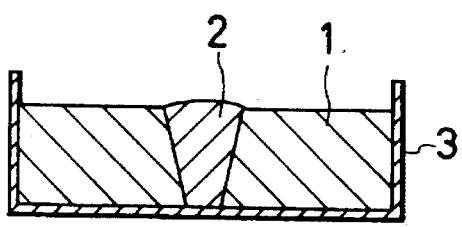
FIG. 4(c) is a sectional view showing the cavity charged with a different type of particles.
Figure 5C:
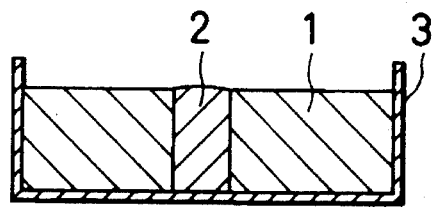
FIG. 5(c) is a sectional view showing the cavity charged with a different type of particles.

The dots making up the letter B pattern of the shaped article shown in FIG. 1(a) are all of the same size. This shaped article can be formed in accordance with the invention using any air flow controller having one or both of a suction port and a blow port. In the interest of brevity, however, the explanation will be limited to the case where the cavities are formed using an air flow controller equipped with the suction port 11 shown in FIG. 1(b). FIG. 2(a) shows an example in which the suction port 11 is positioned above a dry particle course for sucking up particles from a selected portion thereof. Air flows through a hemispherical region centered on the suction port (FIG. (2a)), thereby forming a hemispherical cavity 4 in the particle course (FIG. (2b)). The cavity 4 is then charged with a different type of particles 2 (FIG. (2c)), whereafter the same steps are repeated for producing additional cavities in the pattern of the letter B. In this case, the cavity does not reach the bottom of the particle course but stops midway thereof. Although the cavity can be formed to pass completely through the particle course by increasing the suction force while maintaining the size of the suction port constant, the resulting cavity will become much larger than the diameter of the suction port owing to the increased dispersion of the air flow caused by the increase in suction force. FIGS. 3(a)–3(c) show an example in which the suction of particles is conducted with the suction port 11 inserted to near the base surface at the bottom of the dry particle course 1. As shown in FIGS. 3(a) and 3(b), in this case the air flow forms a tapered cavity 4 in the shape of a conical frustum starting as a circle on the base surface and expanding upward to the surface of the particle course. In this case, the size and shape of the cavity formed can be controlled by using an adjustable suction port with a variable diameter, by increasing only the suction force or by varying the position of the suction part between the upper and lower regions of the particle course. FIGS. 4(a)–4(c) show an example in which the tip of the suction port 11 is fitted with a disk-shaped skirt 13. A number of breather holes 14 of diameters smaller than that of the suction port 11 are formed in the portion of the skirt 13 next to the suction port 11 so that the skirt 13 is able to control the flow of air around the suction port 11 by blocking most of the air flow but allowing a small amount of air to flow through the breather holes 14. In the illustrated example, the suction port 11 with the skirt 13 is positioned above the particle course 1 for sucking up particles therefrom. Since the air flowing through the breather holes 14 first passes downward before rising into the suction port 11, the frustum-shaped cavity can be formed with a smaller taper angle than in the case of FIG. 3. When the arrangement of FIG. 4(a) is used, it is preferable to conduct the suction in discrete pulses so that the air will flow down through the breather holes and then up into the suction port in a sharply defined pattern. This makes it possible to produce a cavity that extends from the upper to the lower surface of the particle course. FIGS. 5(a)–5(c) show an example in which the suction port 11 is provided with a disk-shaped skirt 13 and a breather tube 15 of a diameter smaller than that of the suction port 11 is disposed on the skirt in contact with the suction port. In the illustrated case, the suction port 11 with the skirt 13 and breather tube 15 is positioned above the particle course 1 for sucking up particles therefrom. With this arrangement, since the air flow is focused by the breather tube 15 it becomes even more sharply defined than in the case of FIG. 4, whereby the wall of the cavity 4 can be formed to be almost vertical. As in the case of FIG. 4, it is again preferable to conduct the suction in discrete pulses in order to ensure a sharply defined flow which minimizes the amount of stress imparted to the remaining particle course and thus ensures formation of a neat cavity 4. Since the sharply defined air flow through the breather tube and the pulsating suction prevent the pressure on the wall of the cavity from becoming excessively negative, the wall of the cavity can be formed to be almost vertical.

Any one of the arrangements of FIGS. 2–5 can be used to produce the letter B by repeatedly conducting the steps of forming cavities 4 using the method described in the foregoing and of charging the formed cavities with a different type of particles 2 (as shown in FIGS. 2(c), 3(c), 4(c) and 5(c)). After the shaped article constituted as a patterned dry particle course is completed it is set into an integral mass, either as it is or after being smoothed or after being overlaid with a backing course. Although the cavities 4 are best charged with the different type of particles 2 immediately after they are formed, it is also possible to charge them some time later if the cavities are formed with surfaces inclined at an angle equal to the angle of repose of the particles or if the risk of cave-in has otherwise been eliminated. The charging of particles can be conducted by any of various prior art methods, including hand charging. It is also possible to conduct the charging using a particle feeder integrated with the air flow controller. In particular, the particle supply port can be disposed near or integrally with the suction port or the blow port and be supplied with particles through a pipe connected with a source tank or be supplied with particles from a supply tank positioned directly above the supply port.

Figure 6A:
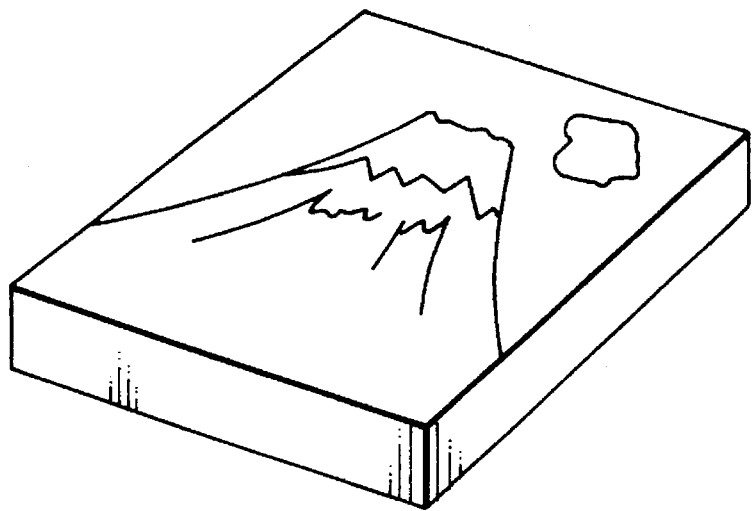
FIG. 6(a) is a perspective view showing a second example of a shaped article produced by the invention.
Figure 6B:
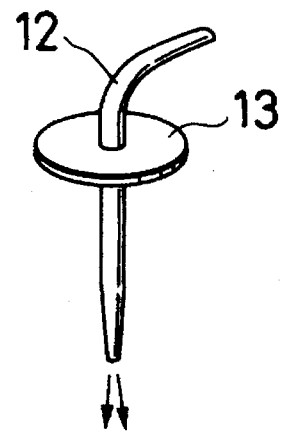
FIG. 6(b) is a perspective view of one type of blow port equipped with a skirt and used in this invention.
Figure 7A:
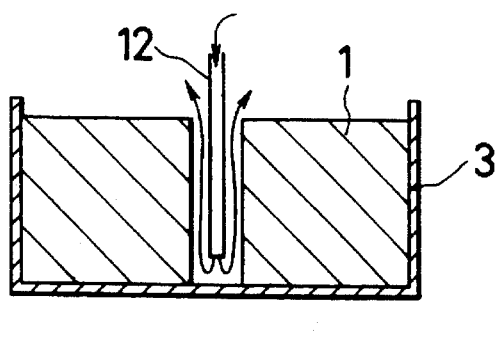
FIG. 7(a) is a sectional view showing a cavity being formed in a particle course by the blow port of FIG. 6(b) deeply inserted into the particle course.
Figure 8A:
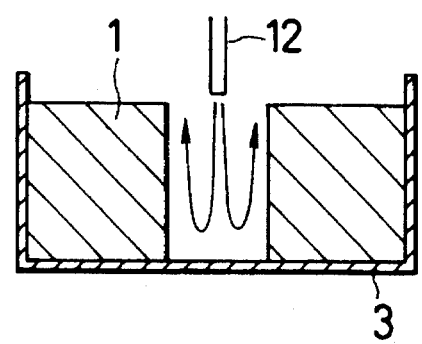
FIG. 8(a) is a sectional view showing a cavity being formed in a particle course by a blow port positioned above the particle course.
Figure 7B:
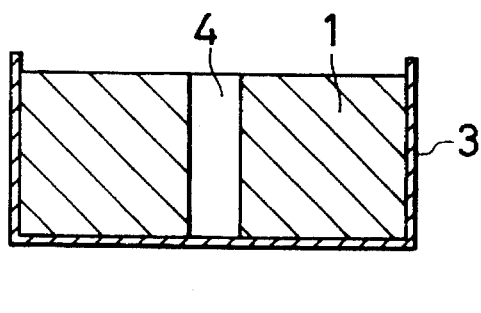
FIG. 7(b) is a sectional view showing the cavity formed in the particle course.
Figure 8B:
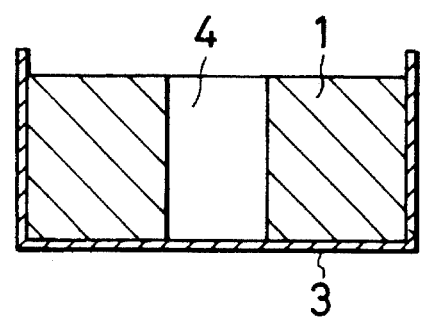
FIG. 8(b) is a sectional view showing the cavity formed in the particle course.
Figure 7C:
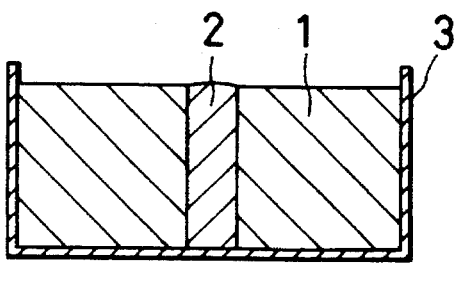
FIG. 7(c) is a sectional view showing the cavity charged with a different type of particles.
Figure 8C:
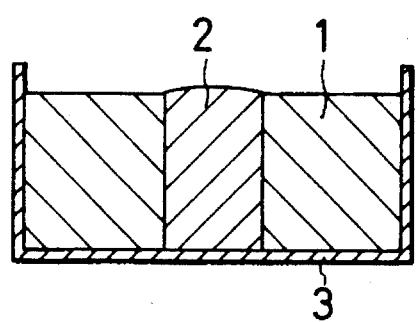
FIG. 8(c) is a sectional view showing the cavity charged with a different type of particles.
Figure 9A:
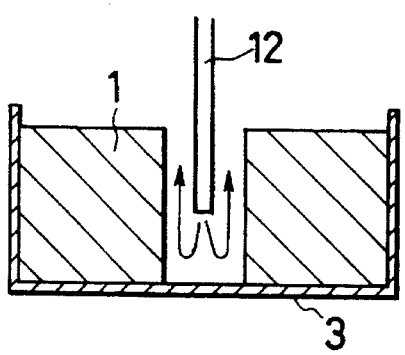
FIG. 9(a) is a sectional view showing a cavity being formed in a particle course by a blow port inserted to a shallow depth in the particle course.
Figure 9B:
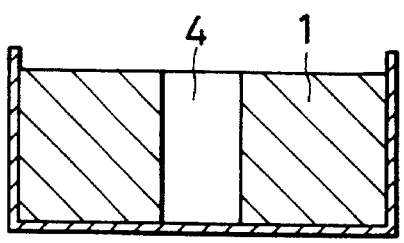
FIG. 9(b) is a sectional view showing the cavity formed in the particle course.
Figure 9C:
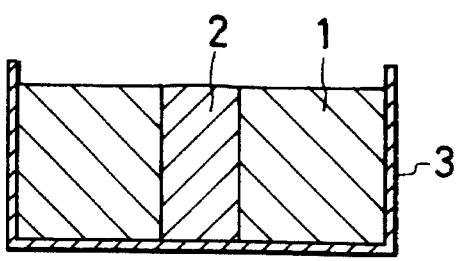
FIG. 9(c) is a sectional view showing the cavity charged with a different type of particles.
Figure 10A:
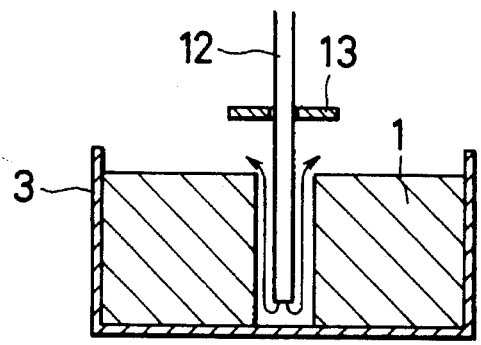
FIG. 10(a) is a sectional view showing a cavity being formed in a particle course by a blow port with skirt inserted in the particle course.
Figure 10B:
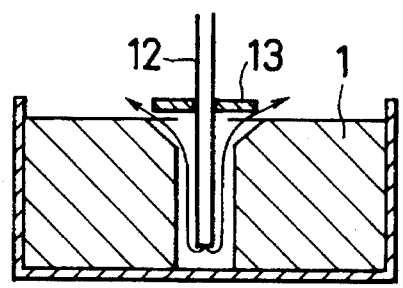
FIG. 10(b) is a sectional view showing further formation of the cavity width movement of the skirt of the blow port.
Figure 10C:
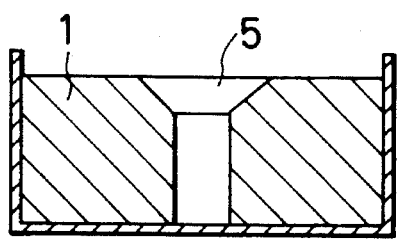
FIG. 10(c) is a sectional view showing the cavity formed in the particle course.
Figure 10D:
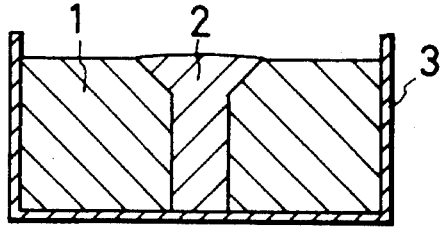
FIG. 10(d) is a sectional view showing the cavity charged with a different type of particles.

FIG. 6(a) shows a shaped article patterned with a mountain scene produced from a photograph and constituted of dots of various sizes. This shaped article can be formed in accordance with the invention by using any air flow controller having one or both of a suction port and a blow port. In the interest of brevity, however, the explanation will be limited to the case where the cavities are formed using an air flow controller equipped with a slender blow port 12 (FIG. 6(b)) whose length is longer than the thickness of the dry particle course formed on the base surface. FIG. 7(a) shows an example in which air is blown from the blow port 12 after it has been inserted to near the base surface at the bottom of a dry particle course 1 produced in a form 3. The air blown from the blow port 12 rises along the pipe of the blow port 12 (FIG. 7(a)) and forms a cylindrical cavity 4 in the particle course whose diameter is only slightly larger than that of the blow port 12 (FIG. 7(b)). As the air flow is constricted by the wall of the particle course 1, it follows a clean upward course and produces a slender cylindrical cavity. Since the air exerts an appropriate positive pressure on the wall of the cavity, the slender cylindrical cavity 4 formed has a vertical wall that does not cave in (though the extent to which this is true depends on the nature of the particles). The diameter of the cylindrical cavity formed can be varied by varying the size of the blow port 12 or by varying the flow speed of the blown air while maintaining the size of the blow port constant. FIG. 8 shows an example in which the blowing of particles is conducted with the blow port 12 positioned above the upper surface of the particle course 1. As can be seen from a comparison of FIG. 7(a) and FIG. 8(a), for the same air flow speed and blow port, the air flow produced in this case forms a cylindrical cavity 4 of a larger diameter than that formed by the method of FIGS. 7(a)–7(c). In the case of FIG. 8(a), the air flow freed from the constriction of the slender pipe and having spread until reaching a balance progressively digs into the particle course 1 by blowing the particles thereof. At the beginning of this process, since the flow is not constricted by a wall of the particle course, the diameter of the cavity 4 formed is much greater than that in the case of FIGS. 7(a)–7(c). The size and shape of the cavity can be controlled by using a blow port that can be varied in size or by controlling the flow rate etc. of the blown air. FIG. 9(a) shows an example in which air is blown at the same flow speed from the same blow port inserted to the center region of the particle course 1. This method falls midway between those illustrated in FIGS. 7 and 8 and produces a cylindrical cavity 4 of a size about midway between those of the same figures. While the air flow is constricted by the wall of the particle course, it also has some degree of freedom, which accounts for the production of a cavity 4 of intermediate size. From this it will be understood that it is possible to control the size, shape etc. of the cavity produced merely by varying the position of the blow port between the upper and lower regions of the particle course, without varying either the size of the blow port or the flow rate of the blown air. FIG. 10(a) shows an embodiment in which the blow port 12 of FIG. 7 is fitted with a disk-shaped skirt 13 which can be moved vertically along the blow port 12 and serves to deflect the air flow. In the illustrated method, a slender cylindrical cavity 4 is first formed using the method of FIG. 7(a) (FIG. 10(a)). Next, the air flow deflecting skirt 13 is lowered gently as shown in FIG. 10(b) so as to form an upwardly flared tapered region above the slender cylindrical cavity. It thus becomes possible to form an angle of repose above the cylindrical cavity. Controlling the air flow at the top of the vertical wall of the cavity in this manner makes it possible to form a surface 5 having the angle of repose, which is advantageous because the resulting stabilization of the cavity against cave-in provides a greater range of freedom in selecting the method and time of particle charging.

Any one of the arrangements of FIGS. 7–10 can be used to produce the mountain scene by repeatedly conducting the steps of forming cavities 4 using the method described in the foregoing and of charging the cavities formed with a different type of particles 2 (as shown in FIGS. 7(c), 8(c), 9(c) and 10(d)). After the shaped article constituted as a patterned dry particle course is completed, it is set into an integral mass, either as it is or after being smoothed or after being overlaid with a backing course. Although the cavities 4 are best charged with the different type of particles 2 immediately after they are formed, it is also possible to charge them some time later if the cavities are formed with surfaces 5 inclined at an angle equal to the angle of repose of the particles or if the risk of cave-in of the cavities forming the pattern has otherwise been eliminated. The charging of particles can be conducted by any of various prior art methods, including hand charging. It is also possible to conduct the charging using a particle feeder integrated with the air flow controller. In particular, the particle supply port can be disposed near or integrally with the suction port or the blow port and be supplied with particles through a pipe connected with a source tank or be supplied with particles from a supply tank positioned directly above the supply port.

Figure 11A:
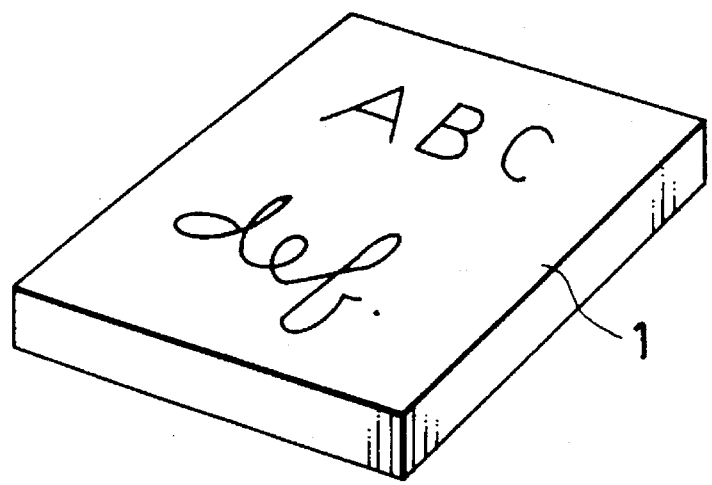
FIG. 11(a) is a perspective view showing a third example of a shaped article produced by the invention.
Figure 11B:
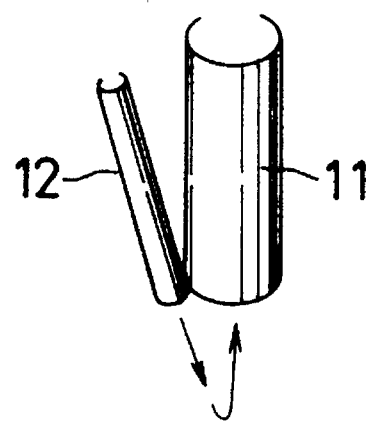
FIG. 11(b) is a perspective view showing a suction port and a blow port used in the invention.
Figure 12A:
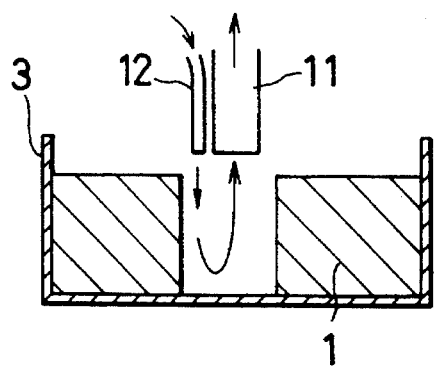
FIG. 12(a) is a sectional view showing a cavity being formed in a particle course by a suction port and a blow port positioned in parallel.
Figure 13A:
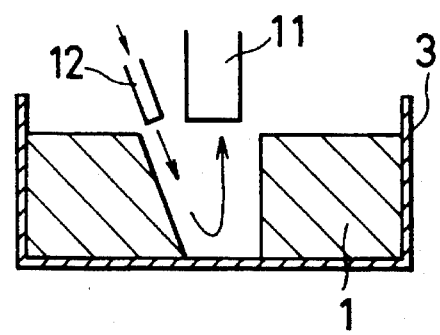
FIG. 13(a) is a sectional view showing a cavity being formed in a particle course by a suction port and a blow port inclined with respect to the blow port.
Figure 12B:
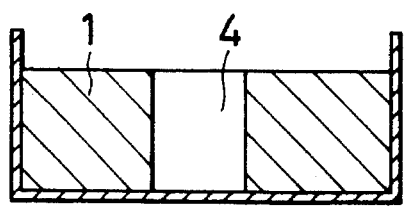
FIG. 12(b) is a sectional view showing the cavity formed in the particle course.
Figure 13B:
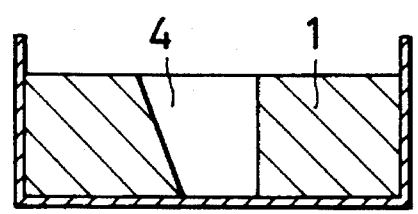
FIG. 13(b) is a sectional view showing the cavity formed in the particle course.
Figure 12C:
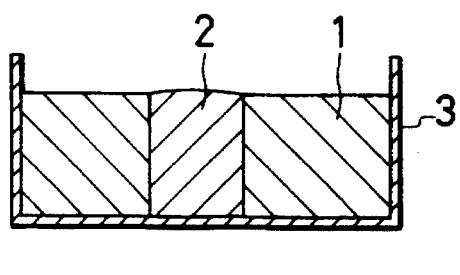
FIG. 12(c) is a sectional view showing the cavity charged with a different type of particles.
Figure 13C:
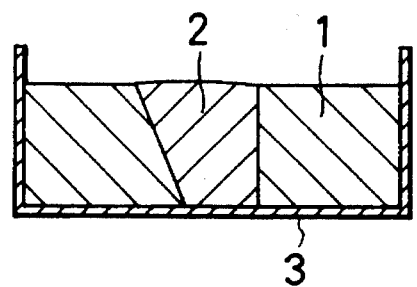
FIG. 13(c) is a sectional view showing the cavity charged with a different type of particles.
Figure 14A:
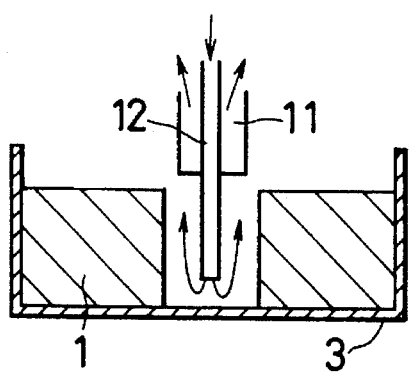
FIG. 14(a) is a sectional view showing a cavity being formed in a particle course by a suction port and a blow port positioned inside the suction port.
Figure 15A:
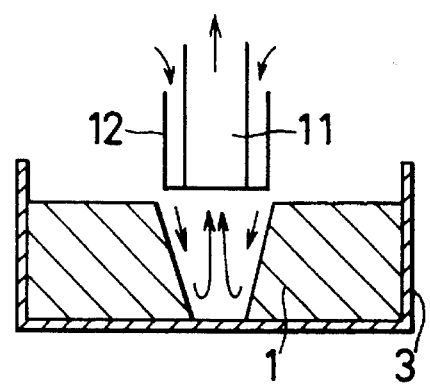
FIG. 15(a) is a sectional view showing a cavity being formed in a particle course by a blow port and a suction port positioned inside the blow port.
Figure 14B:
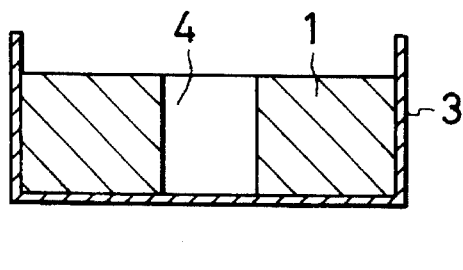
FIG. 14(b) is a sectional view showing the cavity formed in the particle course.
Figure 15B:
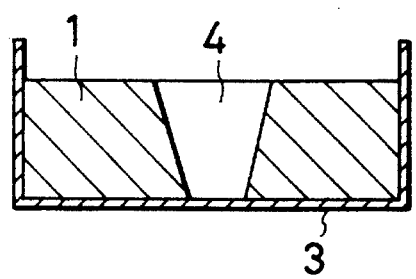
FIG. 15(b) is a sectional view showing the cavity formed in the particle course.
Figure 14C:
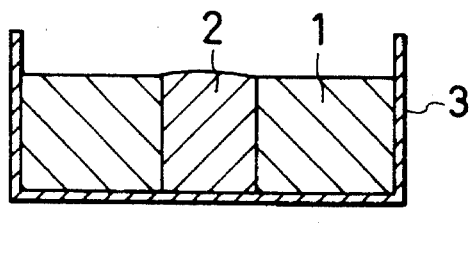
FIG. 14(c) is a sectional view showing the cavity charged with a different type of particles.
Figure 15C:
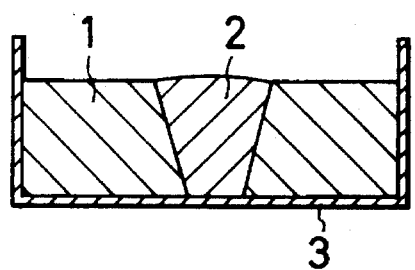
FIG. 15(c) is a sectional view showing the cavity charged with a different type of particles.

FIG. 11(a) shows a shaped article patterned with alphabet letters expressed in continuous lines. This shaped article can be formed in accordance with the invention by using any air flow controller having one or both of a suction port and a blow port. In the interest of brevity, however, the explanation will be limited to the case where the cavities are formed using an air flow controller equipped with both a suction port 11 and a blow port 12 as shown in FIG. 11(b). FIGS. 12(a)–12(c) show an example in which an air flow controller having a suction port 11 and an adjacent blow port 12 of smaller diameter than the suction port is position at the upper surface of a dry particle course 1 and blowing and suction of air are conducted simultaneously. Air is blown from the blow port 12 into the interior of the particle course 1 and, after making a U-turn, is sucked into the suction port 11. Most of the air flowing into the suction port 11 is air blown from the blow port 12 and little air flows into the suction port 11 from its immediate surroundings. Thus by controlling the suction force and the amount, speed, direction etc. of the blown air it is possible to produce a sharply defined U-shaped flow. As the removed particles are being entrained by this flow, the suction port 11 and the blow port 12 are moved over the surface of the particle course 1 in the pattern of the letters to be formed so as to produce a vertically-walled groove as shown in FIG. 12(a). A balance should preferably be established for making the air pressure against the walls of the groove appropriately positive, and for ensuring formation of a continuous groove with vertical walls the pressure should be kept from becoming any more negative than necessary (though the extent to which the walls can be maintained vertical also depends on the nature of the particles). The width, shape and the like of the groove-like cavity produced can be varied by varying the size of the blow port and/or the suction port, the flow speed of the blown air while maintaining the sizes of the blow port and the suction port constant, varying the suction force, or by varying other such parameters. In addition, surfaces having the angle of repose can be produced at the upper portion of the groove-like cavity by carrying out control for expanding the air flow in the vicinity of the suction port. Controlling the air flow at the top of the vertical wall of the groove-like cavity so as to form surfaces having the angle of repose has the advantageous effect of stabilizing the particle course and, as such, provides a greater range of freedom in selecting the method and time of particle charging. FIGS. 13(a)–13(c) show an example in which an air flow controller similar to that of FIG. 12(a) but with the blow port 12 slightly separated from the suction port and adapted to blow air at an angle is positioned with its suction port 11 and blow port 12 at the same height as in the case of FIG. 12, namely with the suction port and blow port positioned at the upper surface of the dry particle course 1. When blowing and suction are conducted with this arrangement, the air flow passes along a wedge-like path angling down from the blow port 12 and then up into the suction port 11 (FIG. 13(a)). As shown in FIG. 13(b), the cavity formed has a trapezoidal configuration with a sloped wall on the side of the blow port 12 and a vertical wall on the side of the suction port opposite from the blow port. Where a line pattern such as that of FIG. 11(a) is to be formed by this method it is advantageous to position the suction port 11 in front and the blow port 12 in back. This is because in the course of forming the cavity the particles removed from the wall in the direction of advance by the air blown from the blow port at the rear are simultaneously sucked up by the suction port at the front, whereby the formed cavity is under positive pressure and not unnecessarily subjected to negative pressure. As a result, a neat cavity can be formed with high efficiency. FIGS. 14(a)–(c) shows an example in which the air flow controller is equipped with a slender blow port 12 that projects downward from the center of a suction port 11 by a considerable length and air is blown from the blow port 12 after the blow port 12 has been inserted into the lower portion of the particle course 1. With this arrangement it is possible to reduce the air to a fine flow. The groove-like cavity 4 produced in this case is thus narrower than when the method of FIG. 12 or 13 is used. Because of the central location of the blow port 12, the arrangement is conveniently able to advance in any direction. By further incorporating the vertically movable disk-like skirt 13 shown in FIG. 10, moreover, it becomes possible to vary the shape of the groove by using the skirt to deflect the air flow. FIGS. 15(a)–15(c) show an example employing a double pipe structure in which the blow port 12 is a doughnut-shaped member enclosing the suction port 11. The air blown from the blow port 12 forms a doughnut-shaped curtain which converges toward the center as it progresses toward the bottom portion of the particle course 1 where it makes a U-turn and is then sucked into the suction port 11. The convergence of this flow can be intensified by increasing the suction force relative to the strength of the blown air. This produces a corresponding convergence in the groove.

Any one of the arrangements of FIGS. 12–15 can be used to produce letters of the alphabet by forming groove-like cavities 4 in prescribed shapes using the method described in the foregoing and then charging the cavities formed in various sizes and shapes with a different type of particles 2 (as shown in FIGS. 12(c), 13(c), 14(c) and 15(c)). After the shaped article constituted as a patterned dry particle course is completed it is set into an integral mass, either as it is or after being smoothed or after being overlaid with a backing course. Although the cavities are best charged with the different type of particles immediately after they are formed, it is also possible to charge them some time later if the cavities are formed with surfaces having the angle of repose or if the risk of cave-in of the cavities forming the pattern has otherwise been eliminated. The charging of particles can be conducted by any of various prior art methods, including hand charging. It is also possible to conduct the charging using a particle feeder integrated with the air flow controller. In particular, the particle supply port can be disposed near or integrally with the suction port or the blow port and be supplied with particles through a pipe connected with a source tank or be supplied with particles from a supply tank positioned directly above the supply port.

In any of the arrangements it is possible to use any of variously configured air flow controllers and to produce various patterns by varying at least one parameter among the air pressure, air flow rate, air flow speed, air flow direction air flow pulsation, air flow intermittence, suction port size, blow port size, suction port position and blow port position. Any type of pattern can be freely produced by whatever method desired.

The diameter of the individual suction ports and/or blow ports should preferably be not greater than twice the thickness of the particle course. Fine blow and suction ports are preferable for the production of fine pattern features. A particularly sharply defined flow can be obtained by making the diameter of the blow port equal to or smaller than the thickness of the particle course. For obtaining well straightened air flows and ensuring formation of sharply defined cavities, it is further preferable for the blow port pipe and breather tube to have lengths which are not less than three times their diameters so that the supplied air can be formed into a laminar flow. In view of the purpose of the skirt, it is preferably provided with a breather tube or breather tubes for the formation of a laminar flow.

The suction related parameters adjusted for controlling the air flow include the size of the suction port, the vertical position of the suction port, the suction intensity (flow rate, flow speed and pressure), the intermittence or pulsation of the suction, the direction of the suction, the amount of swirling flow imparted by the suction, the positioning etc. of a skirt etc., and the size, length and shape of the breather tube(s) etc. Blowing related parameters adjusted for controlling the air flow include the size of the blow port, the vertical position of the blow port, the blowing intensity (flow rate, flow speed and pressure), the intermittence or pulsation of the blowing, the direction of the blowing, the amount of swirling flow imparted by the blowing, and the positioning etc. of a skirt etc. The pipe connecting the suction port with an aspirator and the pipe connecting the blow port with a compressor can be equipped with regulators and/or other types of control valves which can be controlled for controlling the flow of air outside the suction port and the blow port. Otherwise the control signals for the regulators and other control valves, the control signals for the aspirator, compressor and the like and the control signals for the positioning devices and the like can be integrally processed and managed in a computer or a distributed control system. This is preferable in that it enables cavities with neat (regular) sections, cavities with irregular sections, or any other type of cavity to be formed as desired.

A balance should preferably be established for making the air pressure against the wall of the cavity appropriately positive, and for ensuring formation of a hole or continuous groove with vertical walls the pressure should be kept from becoming any more negative than necessary (though the extent to which the walls can be maintained vertical also depends on the nature of the particles). In the case where blowing is conducted with the blow port positioned at the surface of the particle course, for producing a fine and sharply defined cavity it is preferable not to conduct the blowing at a fixed pressure from the beginning but to begin it at a low pressure and then increase the pressure when the cavity being formed has been completed to a size and shape enabling its wall to resist pressure and when a U-turn course has been established by the air flow. The same overall process control should preferably also be implemented in the case where blowing and suction are conducted in combination since this ensures the formation of sharply formed cavities. When suction is used to impart a negative pressure, it is preferable in the case of forming dot-like cavities to conduct the processing in short, pulse-like periods because this prevents cave-in owing to inflow of surrounding air, and preferable in the case of linework to increase the speed of line formation because this minimizes the negative pressure applied at any one point.

In the case of linework, it is advantageous to position the suction port in front and the blow port in back. This is because the wall in the direction of advance is broken down by the air blown from the blow port at the rear so that the formed cavity is under positive pressure and not unnecessarily subjected to negative pressure. As a result, a clean cavity can be formed with high efficiency. Similarly, in the case of using only suction it is preferable to form the line with the breather port, breather tube or other breather member positioned at the rear and the suction port positioned at the front so as not to expose the cavity to unnecessary negative pressure after it is formed.

The angle of repose is formed by controlling the air flow. More specifically, the required configuration is formed at the time of raising the suction port from an inserted position or by enlarging the size of a variable suction port, or the angle of repose is adjusted by selecting the size of a skirt. Forming a surface having the angle of repose has the advantageous effect of stabilizing the particle course and, as such, provides a greater range of freedom in selecting the method and time of particle charging.

A skirt can be preferably used for a wide variety of purposes such as for adjusting the size of the cavity formed, preventing inflow of surrounding air and thus enabling full utilization of the stress produced by the air flowing through the breather ports, and producing an air flow for the formation of an angle of repose. The skirt need not have the disk-like shape described in the foregoing but may be elliptical or triangular or have a drooping configuration with a sectional shape like an inverted letter U. Moreover, it does not have to be in the form of a flange but may instead be a solid body and may be either soft or hard. In addition, it may be attached directly to the suction port or the blow port or be attached so that the length of the suction pipe or the blow pipe can be adjusted by moving the skirt vertically.

Figure 16A:
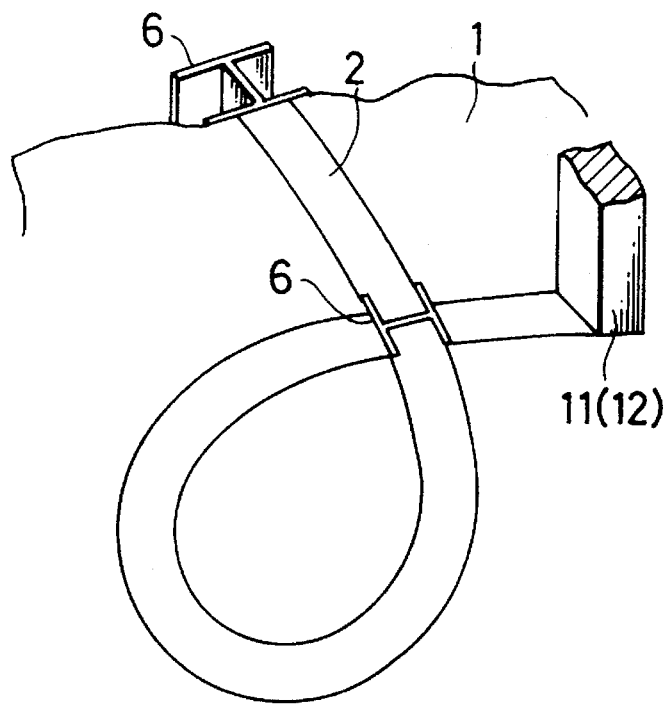
FIG. 16(a) is a perspective view showing a first example of an end stop.
Figure 16D:
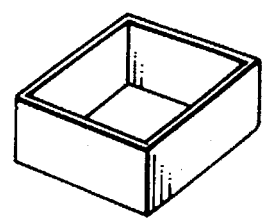
FIG. 16(d) is a perspective view showing a fourth example of an end stop.
Figure 16B:
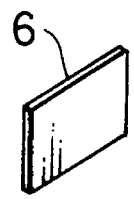
FIG. 16(b) is a perspective view showing a second example of an end stop.
Figure 16E:
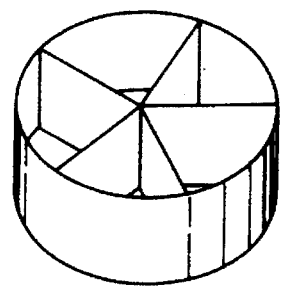
FIG. 16(e) is a perspective view showing a fifth example of an end stop.
Figure 16C:
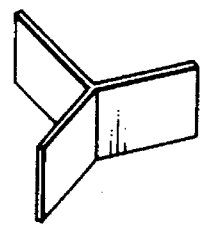
FIG. 16(c) is a perspective view showing a third example of an end stop.

At the time of charging a different type of particles into a cavity formed in the particle course 1, a well finished pattern can be ensured by inserting end stops 6 at the start, end and branch points of the pattern, as shown in FIG. 16(a), and removing them after the pattern has been completed.

While the end stops 6 are shown to be H-shaped in FIG. 16(a), they are not limited to this shape and can be of various other configurations as shown in FIGS. 16(b)–16(e).

As the base surface it is possible to use the bottom plate of a form or, alternatively, a sheet, belt, board or the like, the bottom plate of a double action or other type press, the bottom plate of a form placed on a conveyor, or a belt conveyor or other such endless surface. The particle course can be placed on a board, sheet or other such base surface either as it is or as turned upside down. Although any type of material can be used for the base surface, it is preferable to use unwoven fabric, woven fabric, paper or the like. This is because the particles are able to fit into the irregularities of such materials and this has the effect of stabilizing the bottom surface of the particle course.

In all cases, the various types of air flow controllers can be disposed at the desired position on the particle course either by hand operation or by use of a robot or other such machine. If necessary, moreover, a skirt or other such auxiliary member can be attached to the suction port or the blow port, vibrators and other such auxiliary devices can be installed, and the supply port of a particle feeder can be provided together with the suction and blow ports.

The air flow controller used for forming patterned shaped articles according to this invention can be designed as desired. While it is possible to combine various methods with various arrangements for designing a wide range of different air flow controllers, the explanation will, in the interest of brevity, be limited to those shown in FIGS. 17–31.

Figure 17:
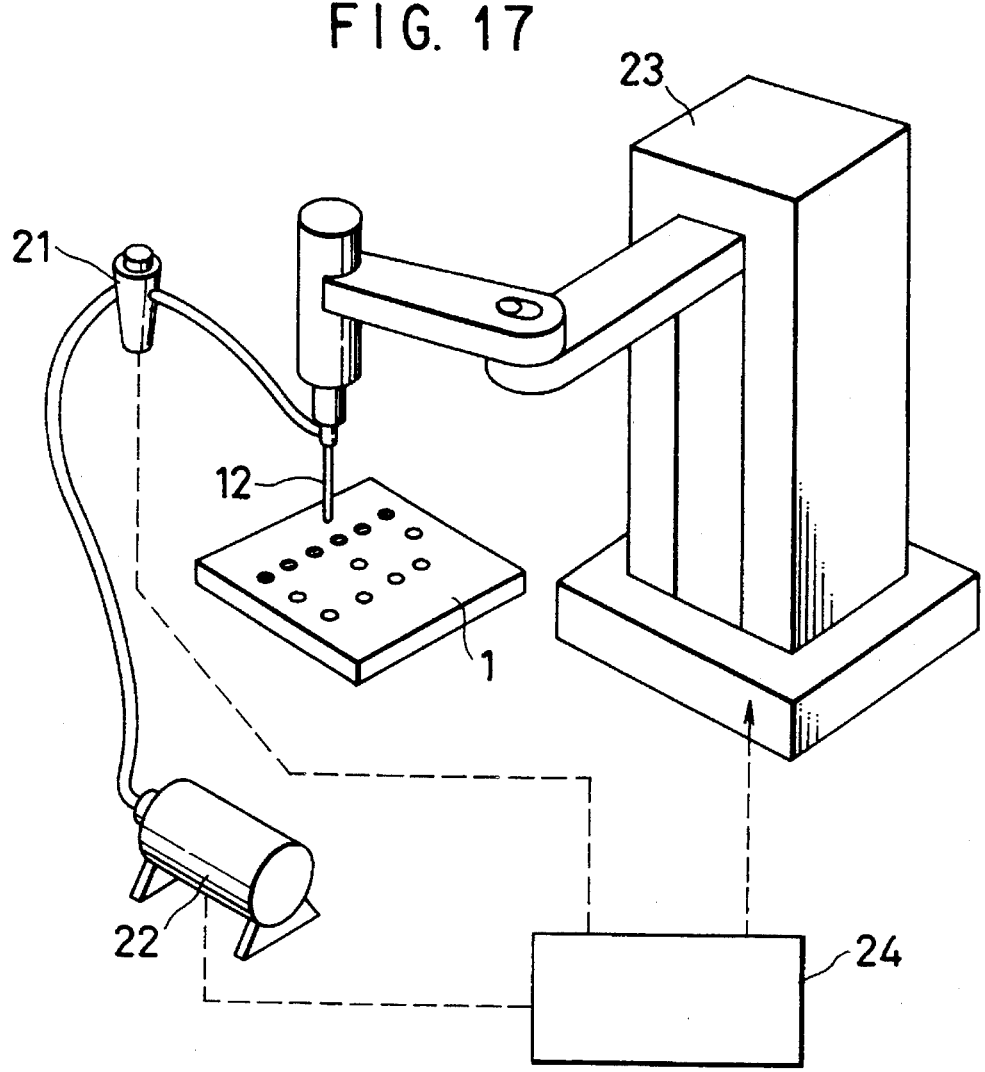
FIG. 17 is a perspective view showing a first example of a molding apparatus that utilizes blowing.
Figure 18:
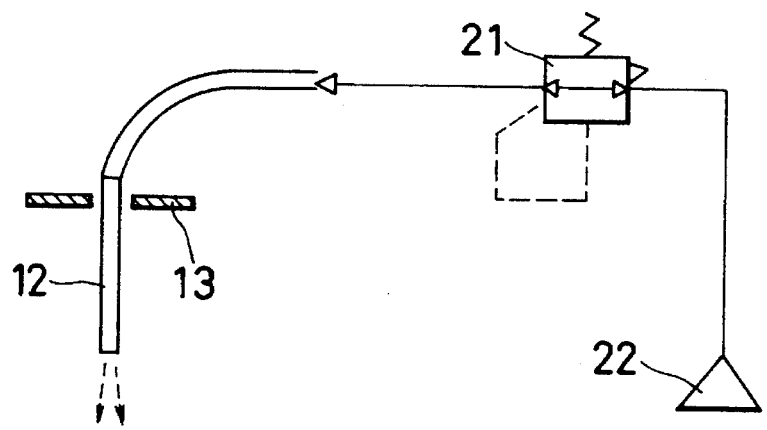
FIG. 18 is a schematic view for explaining the operation of an air flow controller of the molding apparatus of FIG. 17.

The air flow controller shown in FIG. 17 has a blow port 12 connected via a hose with a controllable regulator 21 which is in turn connected by a hose with an air compressor 22 serving as the air source. The blow port 12 is supported by a robot 23 and can be positionally controlled within an XYZ coordinate system and also be directionally controlled (by tilting). The regulator, compressor and robot are integrally controlled by control signals from a computer 24. This air flow controller can be used in the production of shaped articles by the methods of FIGS. 7, 8, 9, etc. but the supply of the different type of particles to the formed cavities has to be conducted separately by hand or some other device. In the case of producing a shaped article by the method of FIG. 10, a vertically movable disk-like skirt 13 is attached to the blow port 12, as shown in FIG. 18.

Figure 19:
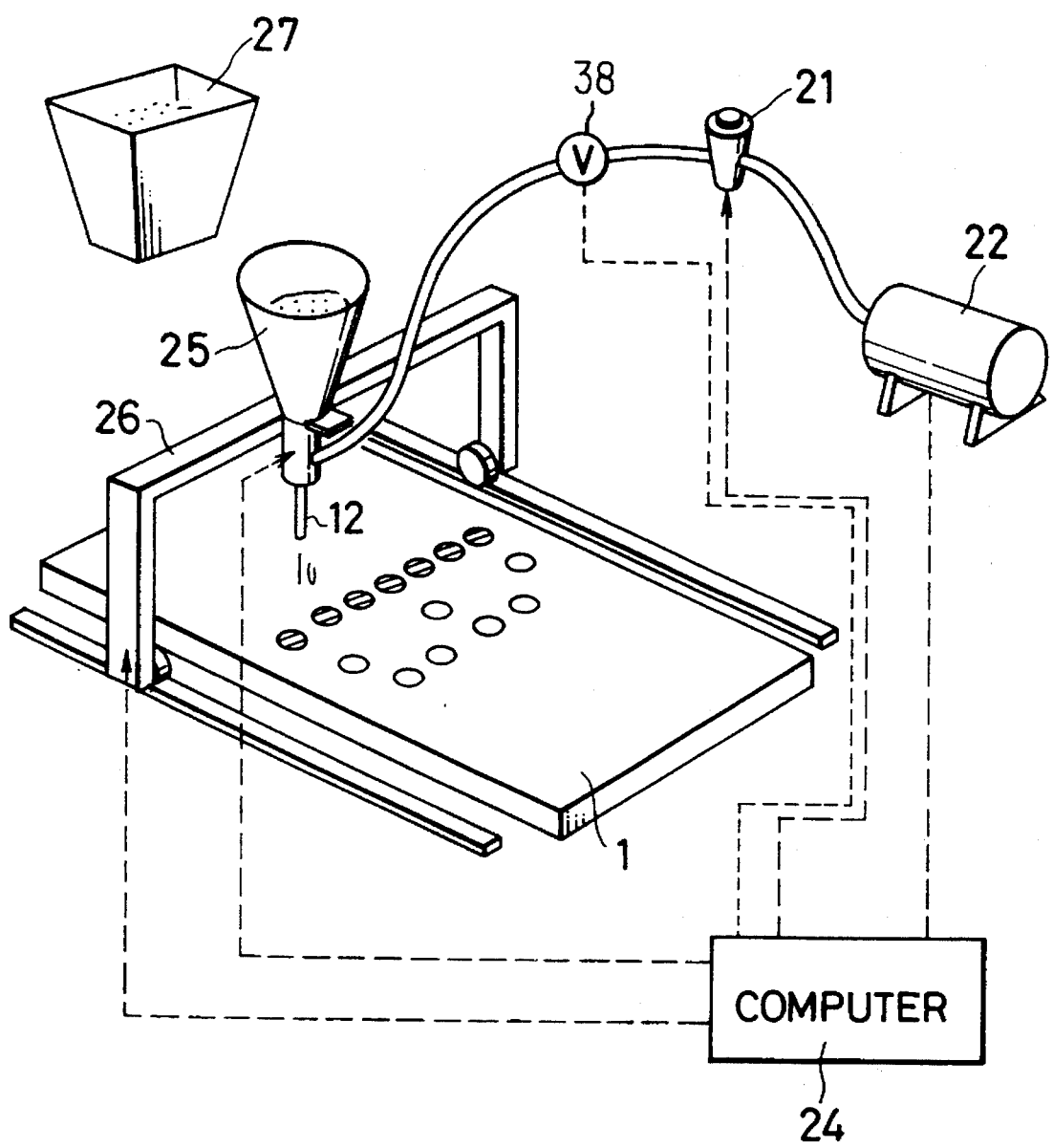
FIG. 19 is a perspective view showing a second example of a molding apparatus that utilizes blowing.
Figure 20A:
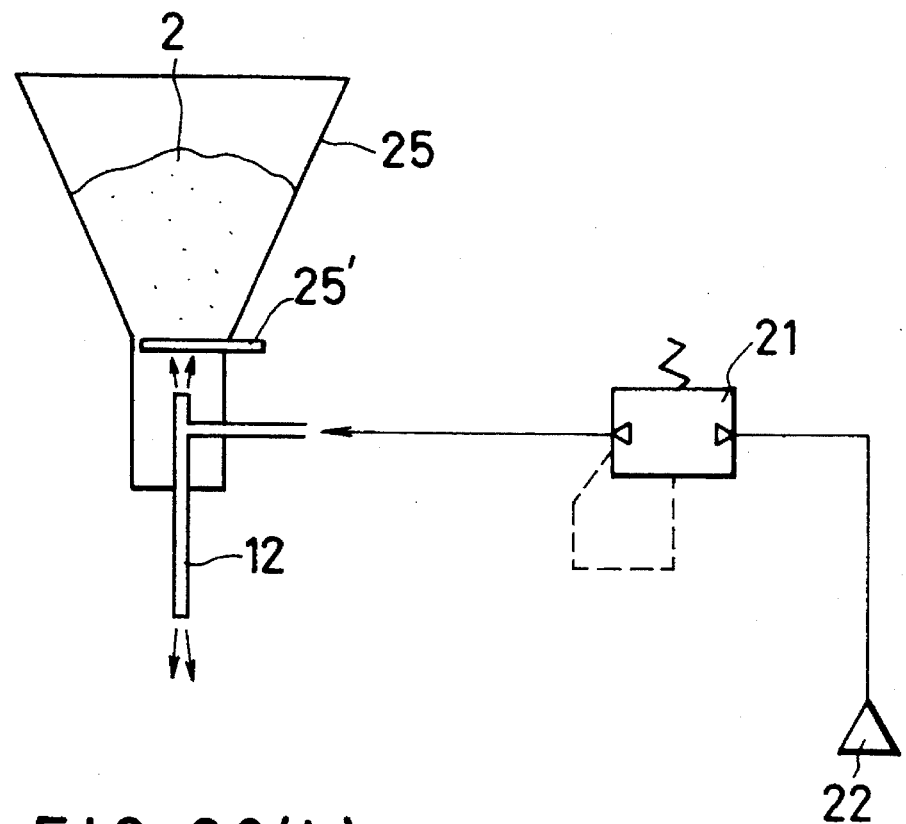
FIG. 20(a) is a schematic view for explaining how the air flow controller of the molding apparatus of FIG. 19 operates when a gate of a particle supply tank is closed.
Figure 20B:
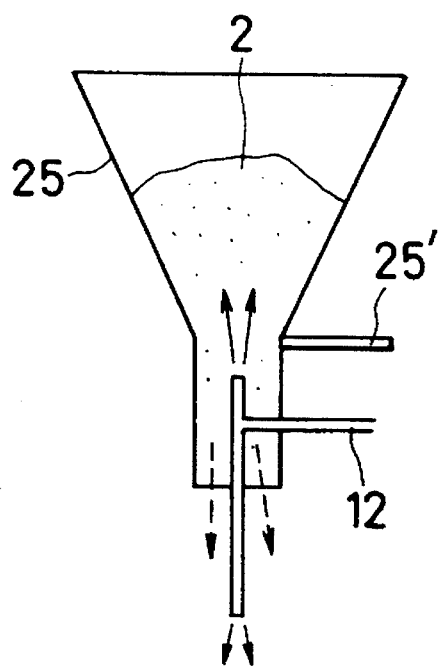
FIG. 20(b) is a schematic view for explaining how the air flow controller of the molding apparatus of FIG. 19 operates when the gate of the particle supply tank is open.
Figure 21:
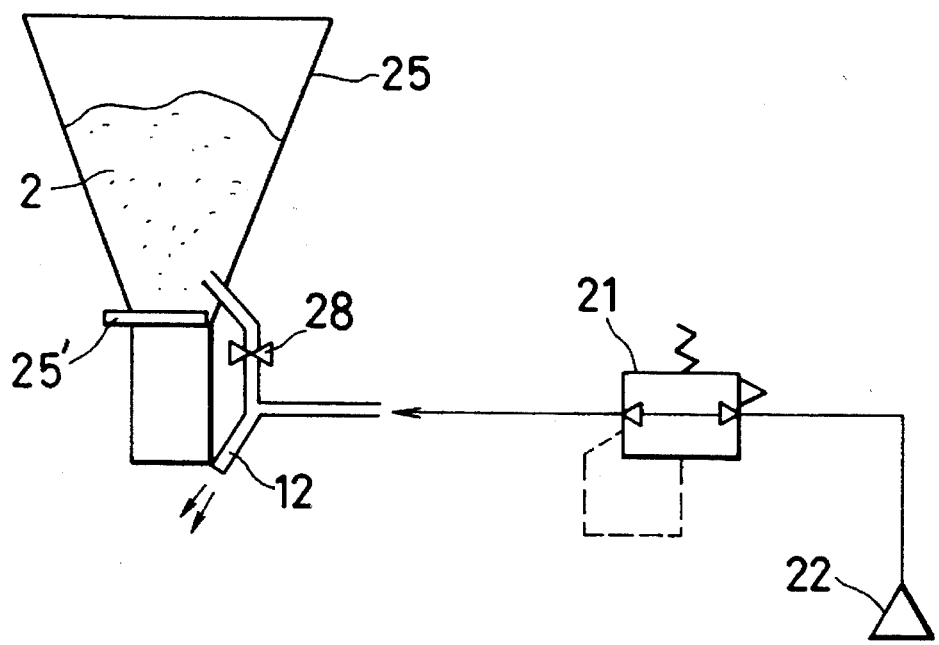
FIG. 21 is a schematic view for explaining the operation of another example of the air flow controller.

The air flow controller shown in FIG. 19 has a gated particle supply tank 25 positioned immediately above a blow port 12. The blow port 12 is connected by a hose via a motor operated valve 38 with a controllable regulator 21 which is in turn connected with an air compressor 22 serving as the air source. The blow port 12 is mounted on a bridge-like frame 26 which is movable in the X and Y directions and is movable vertically with respect to the frame 26. The regulator, compressor and robot are integrally controlled by control signals from a computer 24. The particle supply tank 25 mounted on the frame 26 can be supplied with particles from a source tank 27 when positioned at one end of the frame 26. Since in this air flow controller the supply pipe from the particle supply tank 25 operates to deflect the air flow, the air flow controller can be used not only in the methods of FIGS. 7, 8 and 9 but also in the method of FIG. 10. In addition, as shown in FIG. 20(a), a part of the air which would otherwise be supplied to the blow port 12 is diverted through a branch and blown directly onto the bottom of a gate 25' of the particle supply tank 25. When the gate of the supply tank is open as shown in FIG. 20(b), the particles in the supply tank are fluidized by the air flow, making it easier for them to fall. Owing to this arrangement, the particles 2 can be supplied to cavities 4 by momentarily opening and closing the gate 25'. Since this method makes it possible to form a cavity 4 and then charge it with the particles 2 without moving any positioning device, it enables continuous operation and greatly improves operating efficiency. In addition, when this method is used in cavity formation that does not involve insertion of the blow port or the suction port in the particle course 1, it becomes possible to produce patterns without touching the particle course, which is ideal in the production of patterned shaped articles. FIG. 21 shows an example in which air is branched off directly into the region of the particle supply tank 25 above the gate 25' via a control valve 28 and the blow port is positioned at the side of the supply port. The control valve 28 is opened when the gate is opened for the charging of particles.

Figure 22:
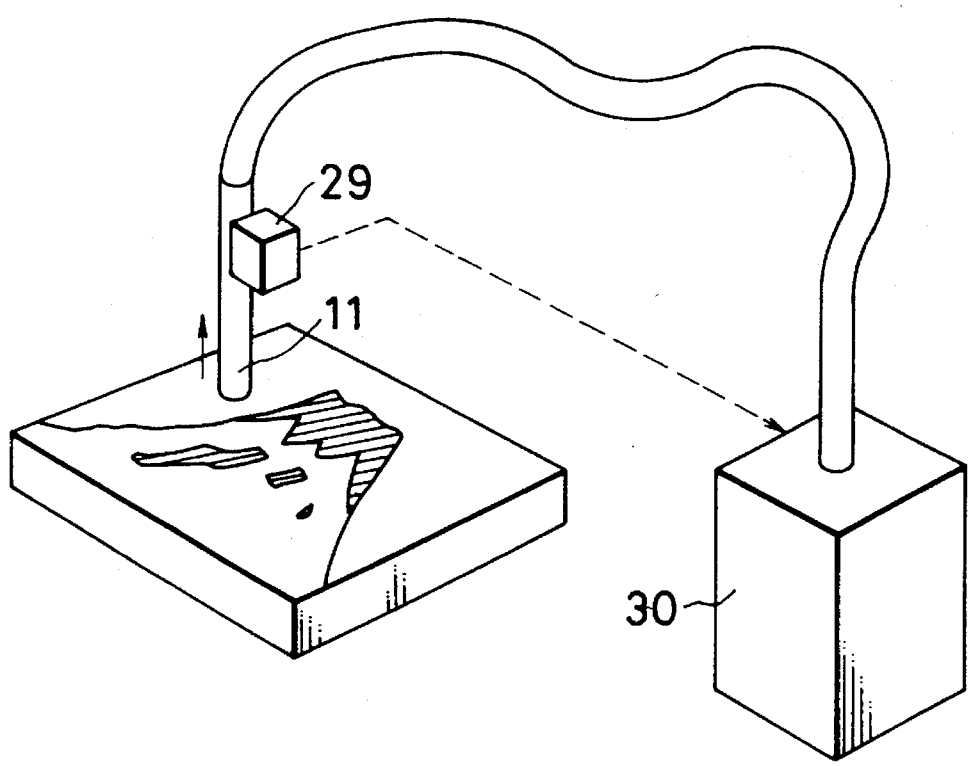
FIG. 22 is a perspective view showing a first example of a molding apparatus that utilizes suction.

In the air flow controller shown in FIG. 22, a local controller 29 equipped with a microcomputer is provided immediately above a suction port 11. The suction port 11 is connected by a hose with an aspirator 30 which can be freely controlled by use of the local controller 29. The suction port 11 including the local controller 29 is held in the hand during formation of cavities. The supply of the different type of particles to the formed cavities has to be conducted separately by hand or some other device. This air flow controller is distinguished from those of FIG. 17 and 19 mainly by its simple configuration.

Figure 23:
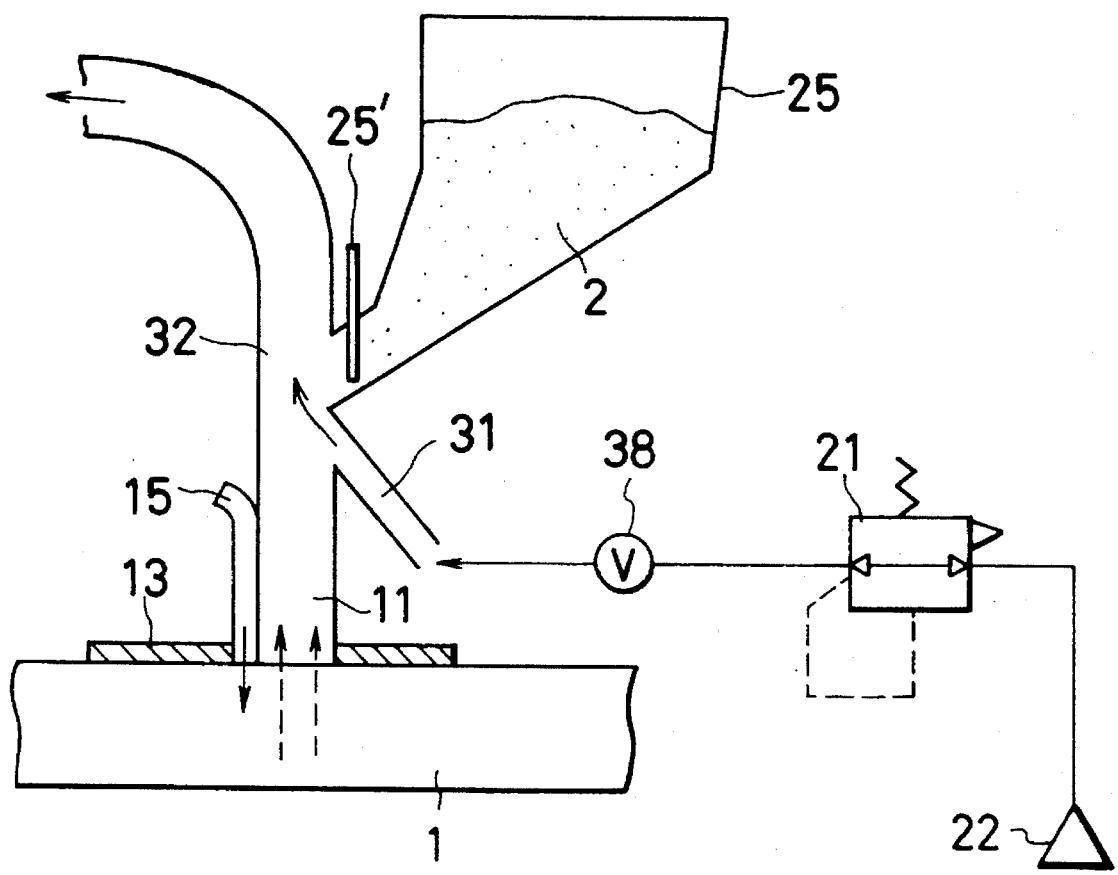
FIG. 23 is a schematic view for explaining the operation of a first example of the air flow controller of the molding apparatus utilizing suction.

FIG. 23 shows another example of an air flow controller equipped with a suction port 11. Suction is produced by an ejector section 32 located immediately above the suction port and constituted by means of an air supply pipe 31. A gated particle supply tank 25 is connected with the suction pipe at a point above the ejector section 32 and a flange-like skirt 13 is provided around the suction port 11 for limiting air flow. The skirt is equipped with a breather tube 15. The system is integrally controlled by a computer or the like that processes the control signals of an air compressor 22 for supplying air to the ejector section 32, a controllable regulator 21 and a motor operated valve 38 positioned between the ejector section 32 and the air compressor 22, a gate 25' and a positioning device (not shown).

Figure 24A:
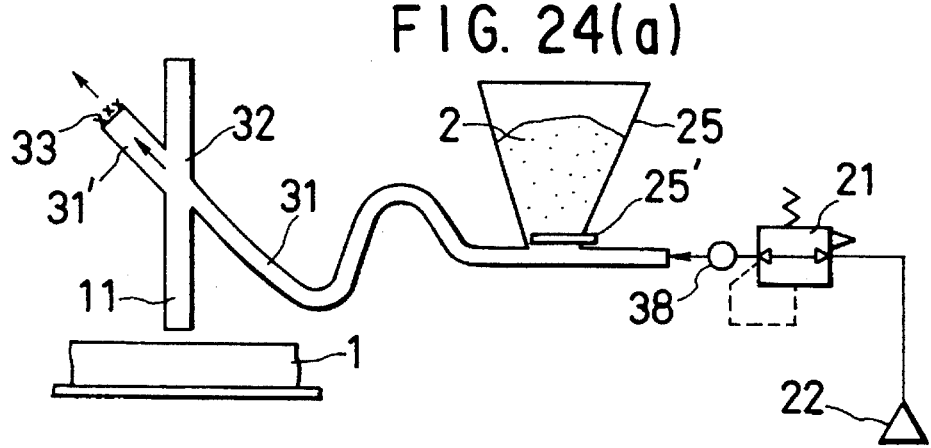
FIG. 24(a) is a schematic view for explaining how a second example of the air flow controller of the molding apparatus utilizing suction operates when a gate of a particle supply tank is closed and the supply of air commenced.
Figure 24B:
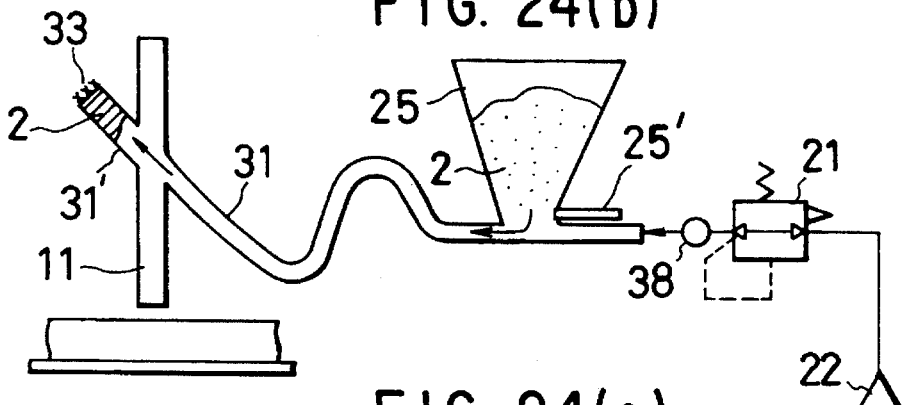
FIG. 24(b) is a schematic view for explaining how the air flow controller of FIG. 24(a) operates when the gate is open.
Figure 24C:
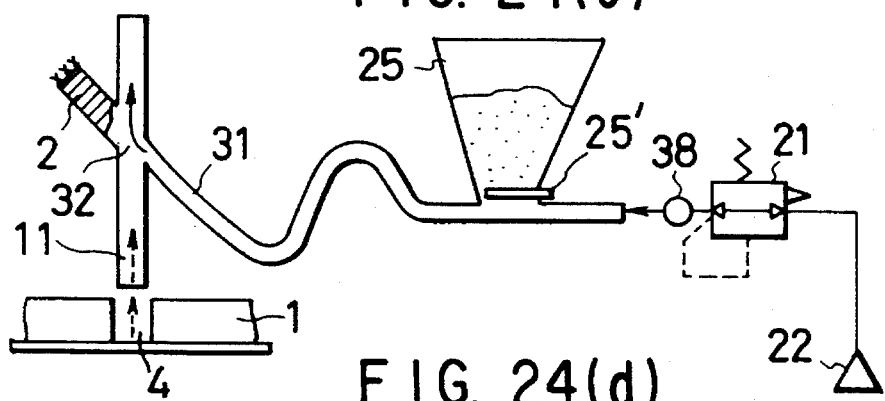
FIG. 24(c) is a schematic view for explaining how the air flow controller of FIG. 24(a) operates when both the gate and an extension pipe of an air supply pipe are closed.
Figure 24D:
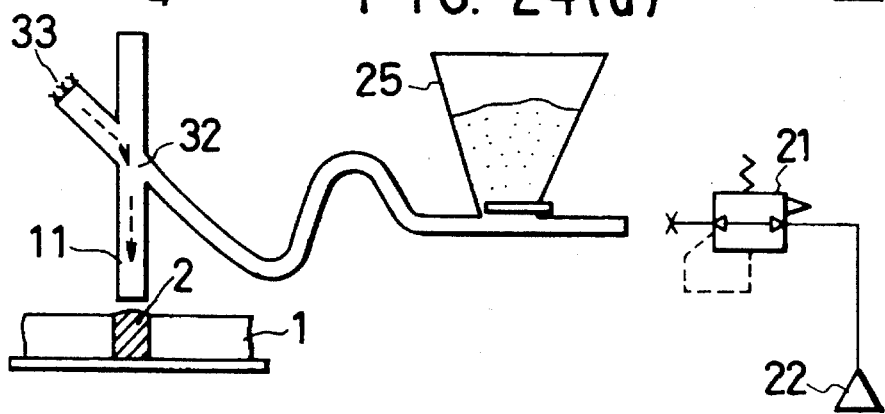
FIG. 24(d) is a schematic view for explaining how the air flow controller of FIG. 24(a) operates when both the gate and the extension pipe is closed and the supply of air cut off.

FIGS. 24(a)–24(d) show an example of an air flow controller having a suction port 11 and, immediately above the suction port 11, an ejector section 32 which uses particles in place of a valve. An air supply pipe 31 is provided for supplying air to the ejector section 32 and a particle supply tank 25 for supplying a different type of particles to the particle course is connected with an intermediate portion of the air supply pipe 31 via a gate 25'. A motor operated valve 38, a controllable regulator 21 and an air compressor 22 are provided upstream of the particle supply tank 25 and are connected by a hose in the order mentioned. As shown in FIG. 24(a), the gate 25' of the particle supply tank 25 is closed and the supply of air commenced. When the gate 25' is opened, as shown in FIGS. 24(b), the air carries off the particles 2 falling from the particle supply tank 25. Once the particles have been carried away, if the gate is closed but the supply of air is continued, the particles 2 that were carried off will enter an extension pipe 31' equipped with a filter, as shown in FIG. 24(b). Since the particles are stopped by the filter, they accumulate in and obstruct the extension pipe 31'. When the extension pipe 31' becomes obstructed, the ejector section 32 begins to function and, as shown in FIG. 24(c), particles of the particle course immediately under the suction pipe are sucked up and removed to form a cavity 4 in the particle course 1. When the supply of air is cut off following the formation of the cavity 4, the particles 2 obstructing the extension pipe 31' (which are of a different type from those of the particle course 1) are no longer pushed into the extension pipe 31' and fall down through the suction pipe to fill the cavity 4 immediately under the suction port 11 as shown in FIG. 24(d). A pattern is formed by repeating these steps. Alternatively, the inlet of the extension pipe 31' can be provided with a valve or a gate for opening and closing it. This makes it possible to forcibly change the air flow, delay the particle charging, or cope with the situation where, as may happen with certain kinds of particles, the extension pipe 31' cannot be completely obstructed so that air continues to leak from the filter. The system is integrally controlled by a computer or the like that processes the control signals for the air compressor for the ejector, the intermediately positioned controllable regulator, the gate of the supply tank and a positioning device (not shown).

Figure 25:
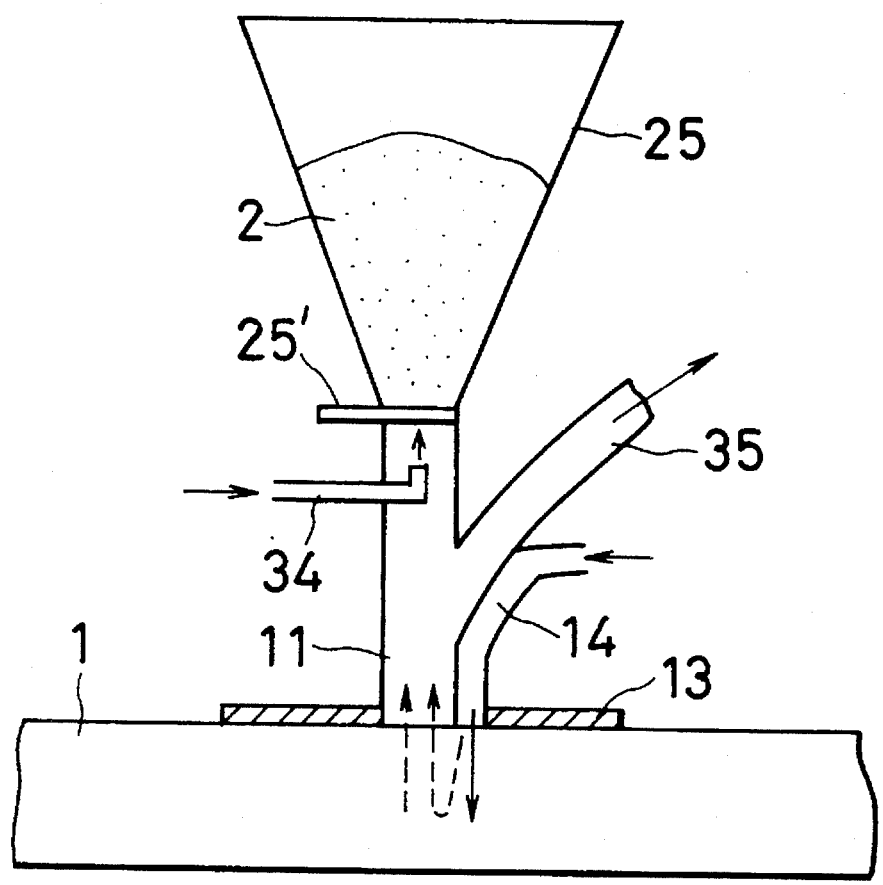
FIG. 25 is a schematic view for explaining the operation of a third example of the air flow controller of the molding apparatus utilizing suction.

FIG. 25 shows another example of an air flow controller having a suction port 11. A particle supply tank 25 is provided immediately above the suction port 11 and connected therewith via a gate 25'. An air nozzle 34 projects into the suction port 11 immediately under the gate 25' for blowing air upward. When the gate 25' is opened, air blown into the particle supply tank 25 from this nozzle increases the fluidity of the particles 2 in the particle supply tank 25, making it easier for them to fall. A suction pipe 35 connected with an aspirator is formed to branch from the suction port 11 at an angle that does not hinder the flow of air. In the illustrated embodiment, a skirt 13 equipped with a breather hole 14 is provided on the lower tip of the suction port. As explained earlier, however, the provision of this skirt is optional. The system is integrally controlled by a computer or the like that processes the control signals for the aspirator, the gate, a regulator (not shown), and a positioning device (not shown).

Figure 26:
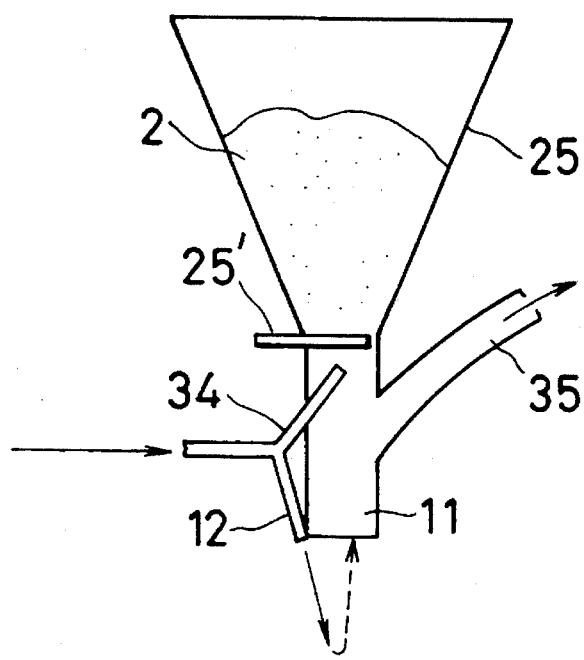
FIG. 26 is a schematic view for explaining the operation of a first example of the air flow controller of the molding apparatus utilizing suction and blowing.

FIG. 26 shows an example of an air flow controller having both a blow port 12 and a suction port 11. A particle supply tank 25 is provided immediately above the suction port 11 and connected therewith via a gate 25'. Similarly to the arrangement in FIG. 25, an air nozzle 34 projects into the suction port 11 immediately under the gate 25' for blowing air upward to fluidize the particles 2 and make it easier for them to fall. A suction pipe 35 connected with an aspirator is formed to branch from the suction port 11 at an angle that does not hinder the flow of air. A blow port 12 is provided at the side of the suction port 11 for blowing air downward at an angle. The blow port 12 is connected with the same air source as the air nozzle 34. The system is integrally controlled by a computer or the like that processes the control signals for the gate, an aspirator (not shown), a regulator (not shown), and a positioning device (not shown).

Figure 27:
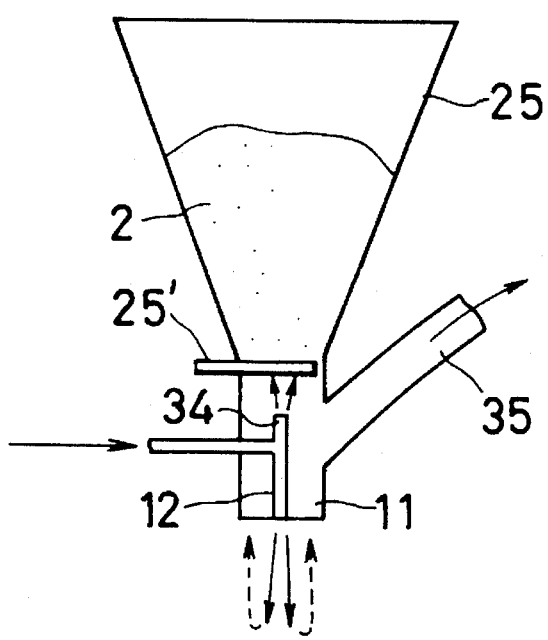
FIG. 27 is a schematic view for explaining the operation of a second example of the air flow controller of the molding apparatus utilizing suction and blowing.

FIG. 27 shows another example of an air flow controller having both a blow port 12 and a suction port 11. While the configuration is generally the same as that shown in FIG. 26, the arrangement differs in that the blow port 12 is not disposed at the side of the suction port but at its center in a double pipe structure. Air is blown downward from the center of the double pipe structure and sucked in through its peripheral region. The system is integrally controlled by a computer or the like that processes the control signals for the gate, a regulator (not shown), an aspirator (not shown), and a positioning device (not shown).

Figure 28:
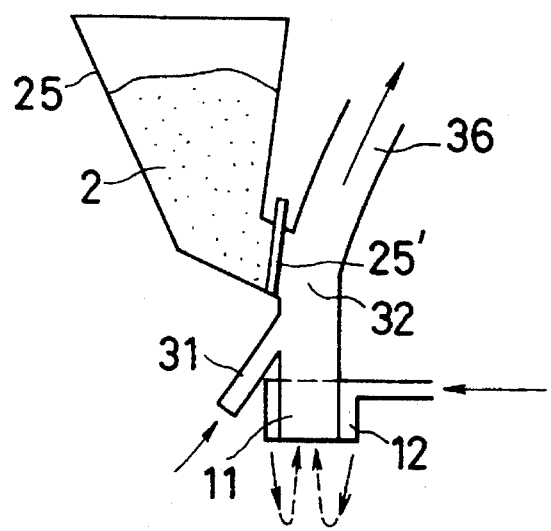
FIG. 28 is a schematic view for explaining the operation of a third example of the air flow controller of the molding apparatus utilizing suction and blowing.

FIG. 28 shows at other example of an air flow controller having both a blow port 12 and a suction port 11. The blow port 12 fully encloses the suction port 11 in a double pipe structure. Air supplied from an air compressor through a controllable regulator is blown downward from the peripheral region of the double pipe structure and sucked in at the center. An air supply pipe 31 is connected with the pipe of the suction port 11 to constitute an ejector section 32. The upstream end of the air supply pipe 31 is connected through a controllable regulator to an air compressor and the ejector is connected with a particle supply tank 25 having a gate 25' and with an exhaust pipe 36. The ejector and the blow port are each equipped with a controllable regulator and the system is integrally controlled by controlling these regulators and the gate 25'.

Figure 29A:
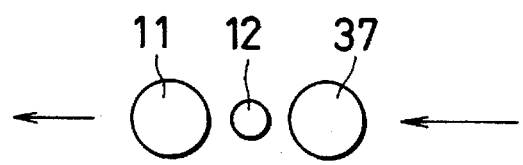
FIG. 29(a) is a schematic view showing a first example of the arrangement of a suction port, a blow port and a particle supply port.
Figure 29B:
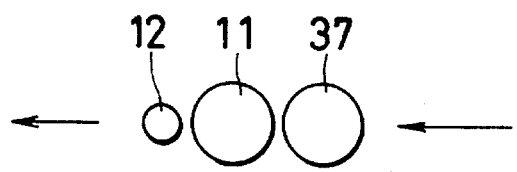
FIG. 29(b) is a schematic view showing a second example of the arrangement of a suction port, a blow port and a particle supply port.
Figure 29C:
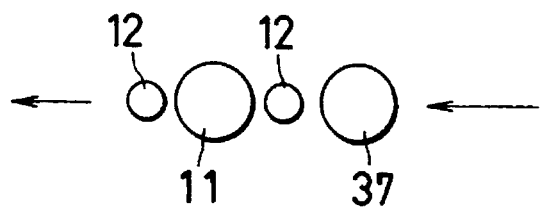
FIG. 29(c) is a schematic view showing a third example of the arrangement of a suction port, a blow port and a particle supply port.

FIGS. 29(a)–24(c) show another example of an air flow controller having both a blow port 12 and a suction port 11. The arrangement is made suitable for linework by positioning a particle supply port 37 at the rear with respect to the direction of advance. In the interest of simplicity, the explanation is limited to the order in which the blow port 12, the suction port 11 and the particle supply port 37 are arranged. Other matters, such as the angle of the blow port, whether and how it is controlled by a regulator, whether the suction port is connected with an ejector or with a separate aspirator, and whether the other type of particles are supplied directly from a supply tank or are conveyed by air, can be determined as desired to obtain numerous combinations of arrangement and method, each of which can be further modified by selection of the height etc. of the blow port, suction port and supply port. Only three typical arrangements of the blow port, suction port and supply port are illustrated. In FIG. 29(a), the suction port 11 is in the lead relative to the direction of advance and the blow port 12 and the particle supply port 37 are lined up behind it. In FIG. 29(b), the blow port 12 is in the lead relative to the direction of advance and the suction port 11 and the particle supply port 37 are lined up behind it. In FIG. 29(c), a first blow port 12 is in the lead and suction port 11, second blow port 12 and the particle supply port 37 are lined up behind it. Control is conducted in accordance with the controllable parameters of the respective arrangements and since the cavity can be continuously charged with the different type of particles immediately after formation, linework can be conducted with high efficiency.

Figure 30A:
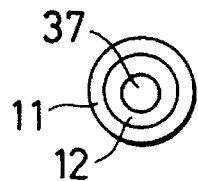
FIG. 30(a) is a schematic view showing a first example of a suction port, a blow port and a particle supply port arranged in a triple pipe structure.
Figure 30B:
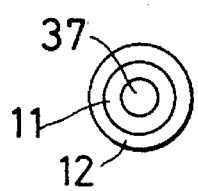
FIG. 30(b) is a schematic view showing a second example of a suction port, a blow port and a particle supply port arranged in a triple pipe structure.
Figure 30C:
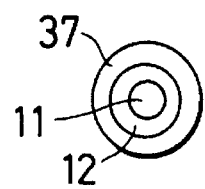
FIG. 30(c) is a schematic view showing a third example of a suction port, a blow port and a particle supply port arranged in a triple pipe structure.
Figure 30D:
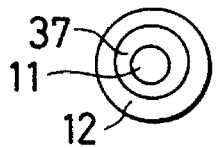
FIG. 30(d) is a schematic view showing a fourth example of a suction port, a blow port and a particle supply port arranged in a triple pipe structure.
Figure 30E:
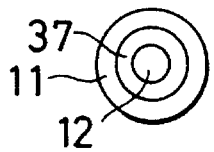
FIG. 30(e) is a schematic view showing a fifth example of a suction port, a blow port and a particle supply port arranged in a triple pipe structure.
Figure 30F:
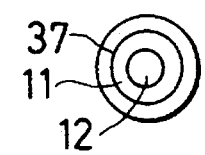
FIG. 30(f) is a schematic view showing a sixth example of a suction port, a blow port and a particle supply port arranged in a triple pipe structure.

FIGS. 30(a)–30(f) show embodiments in which the blow port 12, the suction port 11 and the particle supply port 37 are constituted in a triple pipe structure with one inside, one in the middle and one on the outside. More specifically, FIG. 30(a) shows an embodiment in which the particle supply port 37 is inside, the blow port 12 in the middle and the suction port 11 on the outside; FIG. 30(b) an embodiment in which the particle supply port 37 is inside, the suction port 1 in the middle and the blow port 12 on the outside; FIGS. 30(c) an embodiment in which the suction port 11 is inside, the blow port 12 in the middle and the particle supply port 37 on the outside; FIG. 30(d) an embodiment in which the suction port 11 is inside, the particle supply port 37 in the middle and the blow port 12 on the outside; FIG. 30(e) an embodiment in which the blow port 12 is inside, the particle supply port 37 in the middle and the section port 11 on the outside; and FIG. 37(f) shows an embodiment in which the blow port 12 is inside, the suction port 11 in the middle and the particle supply port 37 on the outside.

Figure 31A:
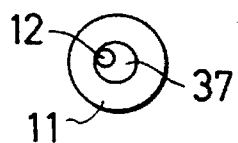
FIG. 31(a) is a schematic view showing a first example of a suction port and a particle supply port arranged in a double pipe structure and a blow pipe disposed inside the inner pipe.
Figure 31B:
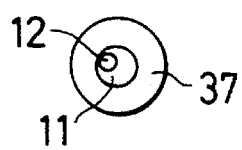
FIG. 31(b) is a schematic view showing a second example of a suction port and a particle supply port arranged in a double pipe structure and a blow pipe disposed inside the inner pipe.
Figure 31C:
FIG. 31(c) is a schematic view showing a first example of a suction port and a particle supply port arranged in a double pipe structure and a blow pipe disposed inside the outer pipe.
Figure 31D:
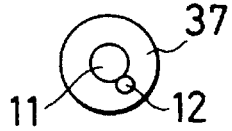
FIG. 31(d) is a schematic view showing a second example of a suction port and a particle supply port arranged in a double pipe structure and a blow pipe disposed inside the outer pipe.
Figure 31E:
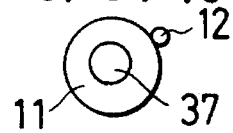
FIG. 31(e) is a schematic view showing a first example of a suction port and a particle supply port arranged in a double pipe structure and a blow pipe disposed outside the outer pipe.
Figure 31F:
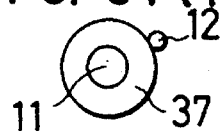
FIG. 31(f) is a schematic view showing a second example of a suction port and a particle supply port arranged in a double pipe structure and a blow pipe disposed outside the outer pipe.

FIGS. 31(a)–31(f) show embodiments in which the suction port 11 and the particle supply port 37 are constituted in a double pipe structure that is provided with the blow port 12. FIG. 31(a) shows an embodiment in which the particle supply port 37 is inside, the suction port 11 is on the outside and the blow port 12 is provided inside the particle supply port 37; FIG. 31(b) an embodiment in which the suction port 11 is inside, the particle supply port 37 is on the outside and the blow port 12 is provided inside the suction port 11; FIG. 31(c) an embodiment in which the particle supply port 37 is inside, the suction port 11 is on the outside and the blow port 12 is provided inside the suction port 11; FIG. 31(d) an embodiment in which the suction port 11 is inside, the particle supply port 37 is on the outside and the blow port 12 is provided inside the particle supply port 37; FIG. 31(e) an embodiment in which the particle supply port 37 is inside, the suction port 11 is on the outside and the blow port 12 is provided outside the suction port 11; and FIG. 31(f) an embodiment in which the suction port 11 is inside, the particle supply port 37 is on the outside and the blow port 12 is provided outside the particle supply port 37.

Since the foregoing embodiments enable cavity formation and particle supply to be conducted continuously, they make it possible to replace the particles with another type of particles with high efficiency. In addition they are well adapted for producing dot patterns and can also be used for linework. In the interest of simplicity, the explanation was limited to the arrangement of the blow port 12, the suction port 11 and the particle supply port 37. However, other matters, such as the angle of the blow port, whether and how it is controlled by a regulator, whether the suction port is connected with an ejector or with a separate aspirator, and whether the other type of particles are supplied directly from a supply tank or are conveyed by air, can be determined as desired to obtain numerous combinations of arrangement and method, each of which can be further modified by selection of the height etc. of the blow port, suction port and supply port. Control is conducted in accordance with the controllable parameters of the respective embodiments and since the cavities can be continuously charged with the different type of particles immediately after formation, pattern formation can be conducted with high efficiency.

Any of the embodiments can be used with variously configured suction ports, blow ports, breather tubes, skirts and other auxiliary members and, in addition, can be combined with the supply port of a particle feeder and other auxiliary devices and the like. Thus the air flow controller can be designed in any manner desired. It is by no means limited to the illustrated examples but can be constituted in various ways by combination with different methods.

Figure 32A:
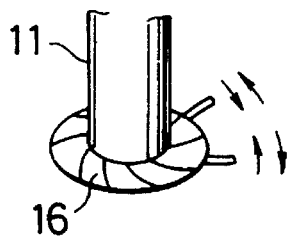
FIG. 32(a) is a perspective view showing another type of suction port equipped with a diaphragm.
Figure 32B:
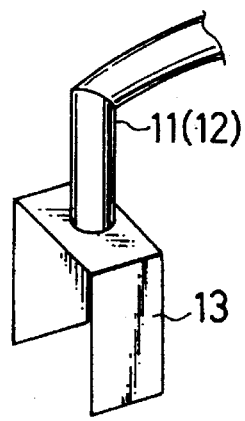
FIG. 32(b) is a perspective view showing still another type of suction port equipped with a skirt formed into a U-shaped frame with its channel directed downward.
Figure 32C:
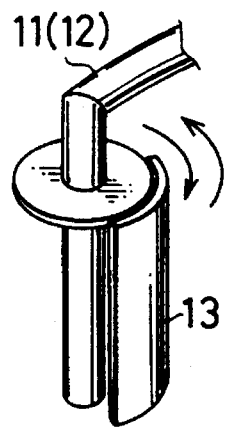
FIG. 32(c) is a perspective view showing yet another type of suction port equipped with a skirt rotatably disposed thereabouts.

As the material for the suction port, blow port, breather tube, skirt and the like there can be used, for example, metal, ceramic, plastic, rubber, paper, wood, unwoven fabric, woven fabric or the like. The shapes of the suction port, blow port, breather tube, skirt and the like can be freely selected. For example, the suction port and blow port can be configured for forming the individual dots as stars, hearts or any of various other shapes. Moreover, the suction port, blow port, breather tube, skirt and the like are preferably of the variable type. For example, arrangements that allow diameter, width, shape or the like to be varied can be used, as will be understood from the suction port fitted with a diaphragm 16 shown in FIG. 32(a). Another example is shown in FIG. 32(b) in which a skirt is formed into a U-shaped frame with its channel directed downward. Otherwise, a skirt 13 may be rotatably disposed around the suction port 11 or the blow port 12 as shown in FIG. 32(c). In this case, the skirt 13 can intercept air flowing from behind or toward behind the direction in which the suction port 11 or the blow port advances to enhance the sucking or blowing efficiency of the suction port or the blow port 12. The skirt 13 shown in FIG. 32 freely follows in the direction in which the suction port or blow port advances and can be advantageously used to focus the air flow in the vicinity of the cavity being formed and ensure formation of a neat cavity. It can also be applied to the embodiments having both the suction port and the blow port as shown in FIGS. 11, 14, 15, etc.

Figure 33A:
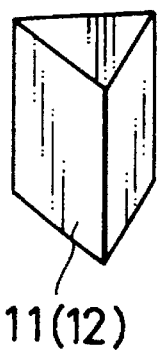
FIG. 33(a) is a perspective view showing a first example of a suction port and a blow port.
Figure 33B:
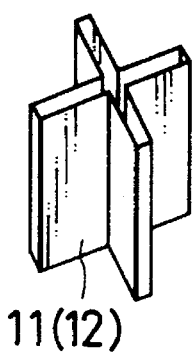
FIG. 33(b) is a perspective view showing a second example of a suction port and a blow port.
Figure 33C:
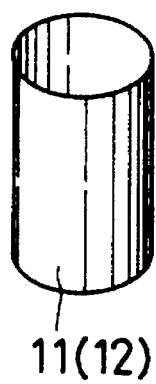
FIG. 33(c) is a perspective view showing a third example of a suction port and a blow port.

Further, the suction port, blow port and supply port do not have to be circular in section but, as shown in FIGS. 33(a)–33(c), can instead have sections that are crucifix or polygonal. The diameter of the individual suction ports and/or blow ports should preferably be not greater than twice the thickness of the particle course 1. Fine blow and suction ports are preferable for the production of fine pattern features. A particularly sharply defined flow can be obtained by making the diameter of the blow port equal to or smaller than the thickness of the particle course. For obtaining well straightened air flows and ensuring formation of sharply defined cavities, it is further preferable for the blow port pipe and breather tube to have lengths which are not less than three times their diameters so that the supplied air can be formed into a laminar flow. In view of the purpose of the skirt, it is preferable provided with a breather tube or breather tubes for the formation of a laminar flow.

Figure 34A:
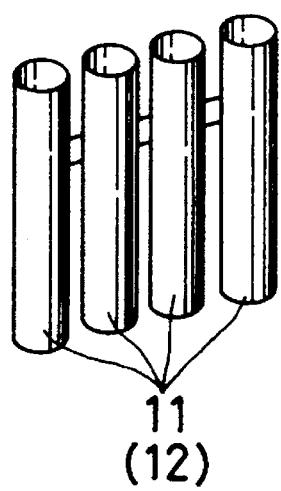
FIG. 34(a) is a perspective view showing a first example of a plurality of suction ports and blow ports in a block assembly.
Figure 34B:
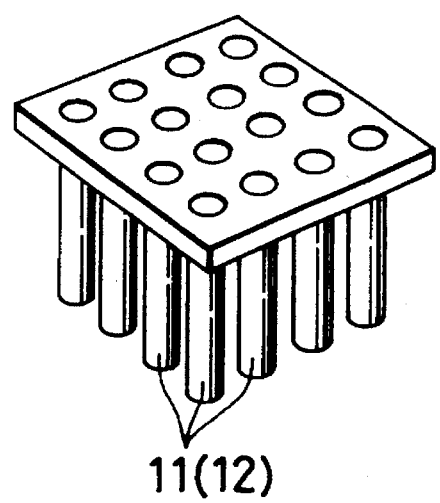
FIG. 34(b) is a perspective view showing a second example of a plurality of suction ports and blow ports in a block assembly.

While a single suction port or blow port suffices, it is also possible to provide multiple ports arrayed linearly or in a matrix, as shown in FIGS. 34(a)–34(b). By making the arrayed ports controllable by a computer for direct pattern production, it is possible to achieve high productivity while enabling free pattern modification and the production of various complex and highly sophisticated patterns.

The suction related parameters adjusted for controlling the air flow include the size of the suction port, the vertical position of the suction port, the suction intensity (flow rate, flow speed and pressure), the intermittence or pulsation of the suction, the direction of the suction, the amount of swirling flow imparted by the suction, the positioning etc. of a skirt etc., and the size, length and shape of the breather tube(s) etc., while blowing related parameters adjusted for controlling the air flow include the size of the blow port, the vertical position of the blow port, the blowing intensity (flow rate, flow speed and pressure), the intermittence or pulsation of the blowing, the direction of the blowing, the amount of swirling flow imparted by the blowing, and the positioning etc. of a skirt etc. The pipe connecting the suction port with an aspirator and the pipe connecting the blow port with a compressor can be equipped with regulators and/or other types of control valves which can be directly operated for controlling the flow of air outside the suction port and the blow port. Otherwise the control signals for the regulators and other control valves, the control signals for the aspirator, compressor and the like and the control signals for the positioning devices and the like can be integrally processed and managed in a computer or a distributed control system. This is preferable in that it enables cavities with neat (regular) sections, cavities with irregular sections, or any other type of cavity to be formed as desired. The invention can be combined with various freely selectable control methods. It is possible to control only one type of controllable parameter or to control several types simultaneously. Various arrangements are possible in addition to those described in the foregoing. In the case of a multiple pipe system such as in the port arrays, multiple pipe structures and multiple port arrangements shown in FIGS. 29, 30 etc., the control signal for the supply port can be processed simultaneously, which makes it possible to replace the removed particles with a different type of particles by charging them almost simultaneously with the removal. Charging efficiency can also be improved by applying pressure on the supply side for forcibly replacing the particles.

As the base surface it is possible to use the bottom plate of a form or, alternatively, a sheet, belt, board or the like, the bottom plate of a double action or other type press, the bottom plate of a form placed on a conveyor, or a belt conveyor or other such endless surface. The particle course can be placed on a board, sheet or other such base surface either as it is or as turned upside down. It suffices to select the combination easiest to use for fabricating the apparatus.

The base surface is preferably formed of unwoven cloth, woven cloth, paper or some other material exhibiting air permeability, liquid permeability and/or liquid absorbing property. The advantage of such materials is that since they promote the escape of entrained air and the removal of excess liquid they help to ensure the strength and uniformity of the shaped article.

In any of the configurations, the apparatus can be combined with particle course formation means such as a squeegee type course forming apparatus or with a sliding supply tank that supplies articles while sliding over the form, a supply tank with a slitted nozzle, a rotary feeder, a device employing an endless honeycomb belt or the like or an endless projection-bristling belt or the like.

In any of the configurations, the positioning of the suction port, blow port, etc. in the X, Y and Z directions and the tilting of the suction port, blow port, etc. can be controlled either manually or by use of any of various positioning mechanisms such as the robot shown in FIG. 17, the bridge-like frame shown in FIG. 19, or an XY table a parallel linkage system, a cartesian coordinate system, a cartesian coordinate robot, an articulated coordinate robot, a cylindrical coordinate robot, a polar coordinate robot or the like. If required, moreover, the suction port, blow port, etc. can be equipped with vibrators and various auxiliary devices, auxiliary members and the like.

In any of the configurations, the free end of a particle course forming apparatus located at the boundary between a chute and a conveyor or the transfer section of a conveyance device can be used as the base surface, and the suction port and/or blow port can be located at this position for forming the cavities simultaneously with the course formation or the transfer operation. This method enables the production of endless patterns.

Use of the various end stops shown in FIG. 16 at the start, end and branch points of the pattern ensures a neat finish to the shape at these points. The shapes of the end stops are not limited to those shown and may varied as desired for obtaining various neatly finished start, end and branch point configurations. Preferably, the end pieces are built into the apparatus to be vertically movable in the vicinity of the suction port or blow port, so that they can be lowered for use when needed.

The method used for charging the formed cavities with particles is not particularly limited. The charging can be conducted by hand or, as shown in FIGS. 29, 30, 31, etc., the particles can be charged through a particle supply port 37 provided integrally with the suction port 11 and the blow port 12, or, as shown in FIGS. 20, 23, etc., can be charged through a suction port 11 or a blow port 12 which doubles as a particle supply port 37. The particles can either be fed to the supply port through a pipe connected with a source tank or be directly supplied to the supply port through a gate from a particle tank located immediately above the supply port. The apparatus can further be combined with a continuous color blender for enabling the individual cavities to be charged with different color particles.

Any of the configurations can be used in combination with various types of presses. For example, it is possible to use the press plate below a double action press as the base surface and, after a patterned shaped article has been formed on the press plate, to press it into a solid mass with the press. Moreover, since there is no need for contact with the particle course, it is also possible to use the roll surface of a roll press as the base surface. In addition, it is possible first to cause a plurality of patterned shaped articles to set as one large one and later cut them into individual articles.

In the method of the present invention, dry particle material is used for forming a course on the base surface. Although the material is dry, it may have absorbed one or more of water, oil, lubricant-bonding agent, solvent, setting agent and plasticizer, if it is not kneaded with water, oil, lubricant-bonding agent, solvent, setting agent or plasticizer and is in a dry state readily amenable to pulverization for supply to the base surface. On the other hand, the material of which the backing layer is formed may be either dry or wet with one or more of water, oil, lubricant-bonding agent, solvent, setting agent and plasticizer. Otherwise, a plate of metal, wood, cement, glass or ceramic or a sheet of paper, unwoven fabrics, woven fabric, knit fabric, plastic, etc. may be used as the backing layer. In this case, the plate or sheet serves as the base surface. In addition, any other existing shaped article may be used as a base surface to be formed with a course that is set together therewith.

The materials to be supplied may differ from one another depending on the shaped article to be produced. Otherwise, in the finished state they are required to differ from one another in color, luster, texture and the like.

In producing a concrete shaped article, the course material is dry and consists mainly of cement powder, resin or a mixture thereof and may additionally include at least one of a pigment and fine aggregates. The material for a backing layer consists mainly of cement powder, resin or a mixture of cement powder and resin, the mixture further containing a fine aggregate and, if necessary, additionally containing a pigment and at least one of coarse aggregates and various kinds of fibers. The backing material may either be dry like the course material or in the form of a concrete slurry obtained by kneading with water etc.

Both the materials for the course and the material for the backing layer may additionally include wood chips as aggregates or fine aggregates and may further include as blended therewith crushed or pulverized granite, crushed or pulverized marble, slag, light-reflecting particles, inorganic hollow bodies such as Shirasu balloons, particles of ceramics, new ceramics, metal, ore or other substances. They may also contain as additives a congealing and curing promoter, a waterproofing agent, an inflating agent and the like. The aforementioned various kinds of usable fibers include metal fibers, carbon fibers, synthetic fibers, glass fibers and the like.

All the materials are supplied to a form etc. and are allowed to set into an integral mass. Otherwise after the material has been supplied, a prescribed amount of water is supplied to all portions of the interior of the form etc., thereby setting the materials into an integral mass within the form etc. If a wet material is used for the backing layer, the amount of water supplied is reduced in view of the water contained in the wet material. When a plate of wood, cement, glass or ceramic or a sheet of paper, unwoven fabric, woven fabric or knit fabric is used as the backing layer, for example, it can be allowed to set integrally with the course. An asphaltic concrete shaped article can be produced using a thermal fusion material such as asphalt.

In producing an artificial stone shaped article, the dry materials for the course may, for example, be constituted of at least one of rock particles, ceramic particles, new ceramic particles, glass particles, plastic particles, wood chips and metal particles and may, as found necessary, further have mixed therewith a pigment etc. Also, the material for the backing layer may, for example, be constituted of at least one of rock particles, ceramic particles, new ceramic particles, glass particles, plastic particles, wood chips and metal particles and may, as found necessary, further have mixed therewith a pigment etc. The material for the backing layer may be either dry or wet. The wet material for the backing layer contains a setting agent. The setting agent contained in the wet material for the backing layer or a setting agent for setting the dry materials for the course and/or the dry material for the backing layer is composed mainly of a mixture of cement powder and water, a mixture of cement powder, resin and water, a mixture of resin and water, a mixture of resin and solvent, or a mixture of resin, water and solvent and may further contain particles of at least one of rock, ceramic, new ceramic, glass and plastic and may, as found necessary, be kneaded with a pigment or colorant and have mixed therewith various kinds of particles, various kinds of fibers, various kinds of mixing agents and various kinds of additives. The various kinds of particles include particles of slag, fly ash and fine light-reflecting substances. The various kinds of fibers include metal fibers, carbon fibers, synthetic fibers and glass fibers. The various kinds of mixing agents and additives include shrink proofing agents, congealing and setting, promoters, delaying agents, water-proofing agents, inflating agents, water reducing agents, fluidizing agents and the like.

For enhancing the adherence of the setting agent with the aforementioned dry materials, the dry materials can be sprayed with or immersed in water, solvent or surface treatment agent, but are not kneaded with water, solvent or surface treatment agent and are in a state readily amenable to pulverization.

All the materials can be set into an integral mass within a form etc. by vacuum-suction treatment, centrifugal treatment or other such treatment for spreading the setting agent between adjacent particles or by using a mixture of an aggregate and a setting agent as the material for the backing layer. When a plate of metal, wood, cement, glass or ceramic or a sheet of paper, unwoven fabric, knit fabric, woven fabric or plastic is used as the backing layer, the course can be allowed to set integrally therewith.

For producing a ceramic shaped article or the raw product for a ceramic shaped article, the dry materials for the course are mainly particles of one or more of clay, rock, glass, new ceramic, fine ceramic and glaze with or without a pigment or colorant added thereto. Although the materials are dry, they may be ones which have absorbed some water or been added with a lubricant-bonding agent if they are hot kneaded with the lubricant-bonding agent or water and are in a state readily amenable to pulverization. The material for the backing layer is constituted mainly of particles of one or more of clay, rock, glass, new ceramic and fine ceramic and may additionally contain a pigment and a colorant. In the finished state, the backing layer is required to differ from the course in color, luster, texture and the like and may be either dry, similarly to the course, or made wet by kneading with water or a lubricant-bonding agent. In addition, either the materials for the course or the material for the backing layer may have further mixed therewith inorganic hollow bodies such as Shirasu balloons, and particles of ceramic, metal or ore and may have added thereto various kinds of foaming agents, fluidization-preventing agents, supernatant agents, lubricating agents, bonding agents and adherence promoters as additives.

The materials supplied into a form etc. are allowed or caused to set into an integral mass without adding or by adding a predetermined amount of water or lubricant-bonding agent to plasticize them and applying pressure to the resultant mixture. The set integral mass is removed from the form etc. and used as a raw product. The raw product is sintered to obtain a ceramic shaped article. Otherwise, the materials supplied into a refractory setter or similar form are melted or fused by heating to obtain an integral mass, and the integral mass is removed from the setter. In the case of a shaped article of enamel, stained glass or crystalline glass the material for the course is laid on a plate of metal, glass or ceramic, partially removed to form a cavity, supplied at the recessed portion with another dry material, and melted or fused by heating to be made integral with the plate.

In producing a raw product to be sintered into a metal shaped article, the dry materials for the course are mainly particles of one or more of metals and alloys and may, as found necessary, further have mixed therewith a lubricant. Although the materials are dry, they may be ones which have absorbed the lubricant if they are not kneaded with the lubricant and are in a state readily amenable to pulverization. The materials for the backing layer are constituted mainly of particles of one or more of metals and alloys and may be either dry or made wet by kneading with a lubricant.

Examples of the lubricant used herein include zinc stearate and other lubricants. The dry materials for the course or the materials for the backing layer may further contain a bonding agent and other additives.

All the materials are supplied into a main form etc., pressed therein and removed therefrom to obtain the raw product for a metal shaped article. The raw material is sintered into a metal shaped article. A metal shaped article may be produced by supplying all the materials onto a sheet of metal, glass, ceramic, etc., applying pressure to the resultant composite to obtain an integral mass of raw product, and sintering the integral mass.

The dry materials for the course used in producing a shaped article having an impasto layer are various kinds of powdered paint, and the material for the backing layer is a plate, sheet or the like of metal, wood, cement or ceramic. The various kinds of powdered paint include acrylic resin, polyester resin, acrylic-polyester hybrid resin, fluorine resin and similar resins having a pigment or colorant added thereto. The materials for the course are laid on the plate, sheet, etc. as a backing layer, supplied at a cavity with another dry material, melted and fused by heating and baked to unite all the layers together. In uniting all the layers together, pressure may be applied to the layers. As a result, it is possible to obtain a plate, sheet, etc. having an impasto layer thereon.

In producing a plastic shaped article, the dry materials for the course are constituted mainly of particles of various kinds of plastics and may additionally contain a pigment or a colorant. The materials may also contain a plasticizer or solvent, but are not kneaded with a plasticizer or solvent and are in a state readily amenable to pulverization. The material for the backing layer may be either dry or made wet by kneading with a plasticizer or solvent. The various kinds of plastics include polyethylene, nylon, polypropylene, polycarbonate, acetal, polystyrene, epoxy, vinyl chloride, natural rubber, synthetic rubber, acrylonitrile-butadiene-styrene, polypropylene oxide, ethylene-vinyl acetate copolymer, fluorine resin and other thermoplastics and thermosetting resins. Both the materials for the course and the material for the backing layer may, as found necessary, contain a foaming agent, oxidization preventing agent, thermal stabilizer, bridging agent, other additives and particles of inorganic materials and the like. All the materials are melted or fused into an integral mass by heating, while applying pressure thereto, if necessary. With this method, it is possible to produce a patterned shaped article of foamed styrol, a patterned shaped bathtub or floor tiles of plastic, etc. In this case, the layers may be united with a plate of metal, wood, cement, ceramic or a sheet of paper, unwoven fabric, knit fabric, woven fabric or plastic.

In producing confectionery or other shaped foodstuffs, the dry materials for the course are constituted mainly of particles of one or more of wheat, rice, potato, bean, corn and sugar and may additionally contain seasonings and spices. The materials may also contain oil, water, etc., but are not kneaded with oil, water, etc. and are in a state readily amenable to pulverization. The material for the backing layer may be either dry, similarly to the materials for the course, or made wet by kneading with oil, water, etc. Both the materials for the course and the material for the backing layer may, as found necessary, further contain an inflating agent and other additives. All the materials are supplied into a form etc. and are allowed to set or caused to set without adding or by adding water, oil, etc. to plasticize them into an integral mass. The integral mass is pressed and then removed from the form, etc. to obtain a raw product. The raw product is then baked. Otherwise, all the materials are baked within the form etc. With this method, it is possible to produce various patterned baked confectioneries etc. It is also possible to produce a patterned shaped article melted by heating, such as a patterned chocolate shaped article etc., by using particles of the material melted by heating, such as chocolate etc., and melting and fusing the particles by heating.

The materials that can be used in the present invention are not limited to those set out as examples herein and various other materials can also be used depending on the shaped article to be produced. Moreover, the range of patterned shaped articles that can be produced can be increased by combining various materials that, in the finished state, differ in property, color, luster, texture and the like. When the methods described above have the steps in common with each other, different kinds of materials can be combined with each other. For example, since both the method for producing a metal shaped article and the method for producing a ceramic shaped article require a common sintering step, metal particles and ceramic particles are used together to form a pattern, whereby cloisonne ware can be produced. The materials used in the method for producing a concrete shaped article and those used in the method for producing an artificial stone shaped article can also be used together.

In the method for producing any of the patterned shaped articles, it is desirable to apply vibration when the materials are supplied onto the base surface so as to ensure smooth movement of the materials. Further, by rubbing with a brush or comb or applying a jet of air or water to the boundary portion between the different kinds of materials for the course, the pattern can be blurred.

In addition, by providing on the base surface or material course a mat of unwoven fabric, paper or other water or oil absorbing material, any excess amount of water, oil, lubricant-bonding agent, plasticizer or solvent can be supplied to any portion deficient in them to uniformly disperse them in the shaped article. As a result, the ratio of the water (auxiliary agents) in the surface to the cement (resins) becomes small and this means that the strength of the shaped article as a whole is enhanced. When an air permeable mat is used in the formation of an article under pressure, degassing is enhanced to obtain a dense article. By vibrating or pressing one or both of the material course and the backing layer when the two layers are being allowed to set into an integral article, the integral article obtained becomes dense and is improved in strength. The article may be reinforced with long fibers, short fibers, wire nets or reinforcing rods by inserting these in or between the two layers. The method of using an article obtained by the sheet making method or extrusion molding method or any of various plates or sheets as the backing layer is applicable to the production of various articles including architectural panels and boards, wall sheets and tiles. The surface of an existing concrete article can be used as the base surface. In this case, the materials for the material course are discharged onto the concrete surface and set to be integral with the existing concrete article.

In the method of producing a shaped article according to this invention, it is possible to produce a shaped article with a curved finished surface by using a deformable mat as the base surface or using a partially or generally deformable form.

The invention makes it possible to express a photographed image in the form of dots or lines without using an auxiliary form, cell body, bristling body or any other such divider or partition member. Moreover, since dots and lines of differing size and shape can be freely produced without inserting a suction port or blow port into the particle course, it is possible to use high-speed scanning in pattern production. In addition, since the portion of the pattern corresponding to the background is formed on the base surface in advance so that individual pattern portions thereof do not have to be charged individually, the amount of charging work etc. required is greatly reduced and the productivity is enhanced. Very high productivity is further ensured by the fact that the formed cavities can be charged at high speed and efficiency by means of an air flow. Since the invention does not require the use of auxiliary frames, cell bodies, bristling bodies or the like as dividers or partition members, the peculiarities of such members (such as the hexagonal patterning produced by a honeycomb partition member) do not show up in the product so that the patterns can be naturally expressed. The invention is thus able to produce patterns resembling handwriting and when used to make sidewalk or pavement tiles patterned with maps, directions or the like is able to produce a product that is resistant to abrasion and pleasing to the eye.

As another of its effects, the invention enables formation of cavity patterns in randomly blended particle courses and, as such, makes it possible to produce patterns within a variegated background. Further, in the case of centrifuged concrete, since the particle course can be formed first and the cavities can be formed and charged to produce the pattern thereafter and, moreover, the formation and charging of the cavities can be conducted from the surface of the course, the pattern can be easily produced even during high-speed rotation. In addition, since, by dint of its operating principle, the invention permits patterning of a particle course irrespective of its size, it can be worked in conjunction with an endless conveyor or the like for simple production of continuous patterned shaped articles.

Use of computer control makes it possible to produce patterns directly, achieve high production efficiency and modify the patterns at will. By controlling at least one parameter among the air pressure, air flow rate, air flow speed, air flow direction, air flow pulsation, air flow intermittence, suction port size, blow port size, suction port position and blow port position, it is possible to produce the subtle differences in the air flow needed for forming finely configured cavities and thus to produce patterned shaped articles with various complex and sophisticated patterns.

By these production methods, it is possible to easily produce concrete shaped articles, artificial stone shaped articles, raw products for sintering into ceramic shaped articles, ceramic shaped articles, metal shaped articles, impasto shaped articles, plastic shaped articles and shaped foodstuffs including confectionery each having a pattern of a prescribed thickness formed on part or all of the surface thereof. Therefore, the patterned shaped articles can maintain their patterns in excellent condition even when exposed to surface abrasion. Since the pattern layer is formed by a combination of various kinds of dry materials, the materials can, owing to their cave-in action, be densely charged without any gaps and the boundaries between adjacent materials can be minutely expressed. The pattern formed is thus very clear-cut.

What is claimed is:

1. A method of producing a patterned shaped article, the method comprising the steps of:

forming a course of first dry particles on a base surface;

using an air flow controller having at least one of at least one suction port and at least one blow port to cause an air flow to form a cavity in the course by removing a part of the first dry particles thereof in accordance with a pattern to be expressed and under a control of at least one parameter among air pressure, air flow rate, air flow speed, air flow direction, air flow pulsation, air flow intermittence, suction port size, blow port size, suction port position and blow port position;

charging the cavity with second dry particles; and allowing the first and second dry particles to set into an integral mass.

2. A method according to claim 1, further comprising a step of overlapping the course with a backing layer after charging the cavity with the second dry particles and before allowing the first and second dry particles to set into an integral mass.

3. A method according to claim 1, wherein the cavity is formed by one of the at least lone suction port and the at least one blow port with its tip positioned above the course.

4. A method according to claim 1, wherein the cavity is formed by one of the at least one suction port and the at least one blow port with its tip inserted into the course.

5. A method of producing a patterned shaped article, the method comprising the steps of:

forming a course of first dry particles on a base surface;

using an air flow controller having a suction port and a blow port positioned inside the suction port to cause an air flow to form a cavity in the course by removing a part of the particles thereof in accordance with a pattern to be expressed and under a control of at least one parameter among air pressure, air flow rate, air flow speed, air flow direction, air flow pulsation, air flow intermittence, suction port size, blow port size, suction port position and blow port position;

charging the cavity with second dry particles; and allowing the first and second dry particles to set into an integral mass.

6. A method according to claim 5, further comprising a step of overlapping the course with a backing layer after charging the cavity with the second dry particles and before allowing the first and second dry particles to set into an integral mass.

7. A method according to claim 5, wherein the cavity is formed by the suction port and the blow port with their tips positioned above the course.

8. A method according to claim 5, wherein the cavity is formed with the blow port inserted into the course.

9. A method of producing a patterned shaped article, the method comprising the steps of:

forming a course of first dry particles on a base surface;

using an air flow controller having a blow port and a suction port positioned inside the blow port to cause an air flow to form a cavity in the course by removing a part of the particles thereof in accordance with a pattern to be expressed and under a control of at least one parameter among air pressure, air flow rate, air flow speed, air flow direction, air flow pulsation, air flow intermittence, suction port size, blow port size, suction port position and blow port position;

charging the cavity with second dry particles; and allowing the first and second dry particles to set into an integral mass.

10. A method according to claim 9, further comprising a step of overlapping the course with a backing layer after charging the cavity with the second dry particles and before allowing the first and second dry particles to set into an integral mass.

11. A method according to claim 9, wherein the cavity is formed by the suction port and the blow port with their tips positioned above the course.

12. A method according to claim 9, where the cavity is formed with the suction port inserted into the course.

13. A method of producing a patterned shaped article, the method comprising the steps of:

forming a course of first dry particles on a base surface;

using an air flow controller having at least one blow port and at least one suction port which are arranged at prescribed positions in accordance with directions of an air flow acting on the first dry particles to cause the air flow to form a cavity in the course by removing a part of the particles thereof in accordance with a pattern to be expressed and under a control of at least one parameter among air pressure, air flow rate, air flow speed, air flow direction, air flow pulsation, air flow intermittence, suction port size, blow port size, suction port position and blow port position;

charging the cavity with second dry particles; and allowing the first and second dry particles to set into an integral mass.

14. A method according to claim 13, further comprising a step of overlapping the course with a backing layer after charging the cavity with the second dry particles and before allowing the first and second dry particles to set into an integral mass.

15. A method according to claim 13, wherein the cavity is formed by at least one of the at least one suction port and the at least one blow port, with at least one of their tips positioned above the course.

16. A method according to claim 13, wherein the cavity is formed by at least one of the at least one suction port and the at least one blow port, with at least one of their tips inserted into the course.

17. A method according to claim 13, wherein the cavity is formed by at least one of the at least one suction port and the at least one blow port positioned vertically above the course.

18. A method according to claim 13, wherein the cavity is formed by the at least one suction port positioned vertically above the course and the at least one blow port positioned at an angle above the course.

* * * * *